(12) United States Patent
Brill et al.

(10) Patent No.: US 9,222,024 B2
(45) Date of Patent: Dec. 29, 2015

(54) POLYMERIZED FILMS WITH LINE TEXTURE OR FINGERPRINT TEXTURE

(75) Inventors: Jochen Brill, Speyer (DE); Ulrich Schalkowsky, Speyer (DE); Thomas Musiol, Maxdorf (DE); Claus Hoffmann, Morschheim (DE); Olivier Enger, Basel (CH); Oliver Seeger, Mannheim (DE)

(73) Assignee: BASF SE, Ludwigshafen (DE)

( * ) Notice: Subject to any disclaimer, the term of this patent is extended or adjusted under 35 U.S.C. 154(b) by 357 days.

(21) Appl. No.: 13/090,800

(22) Filed: Apr. 20, 2011

(65) Prior Publication Data

US 2011/0255073 A1    Oct. 20, 2011

Related U.S. Application Data

(60) Provisional application No. 61/325,856, filed on Apr. 20, 2010.

(51) Int. Cl.
*G01B 11/24* (2006.01)
*B05D 3/00* (2006.01)
(Continued)

(52) U.S. Cl.
CPC ............ *C09K 19/322* (2013.01); *B05D 3/0209* (2013.01); *B05D 3/067* (2013.01);
(Continued)

(58) Field of Classification Search
CPC .. C09K 19/2007; C09K 19/24; C09K 19/322; C09K 19/3497; C09K 19/54; C09K 19/3405; C09K 2019/0448; C09K 2219/03; G01B 11/14; G01B 11/24; Y10T 428/24446; B05D 3/0209; B05D 3/067; B05D 3/0254; B05D 5/02; B05D 7/04

USPC ................................................... 428/141, 152
See application file for complete search history.

(56) References Cited

U.S. PATENT DOCUMENTS 6,605,235 B1 * 8/2003 Meyer et al. ............. 252/299.01
6,733,698 B2    5/2004 Hanson et al.
(Continued)

FOREIGN PATENT DOCUMENTS

JP    2000-239402    9/2000
JP    2007-332195    12/2007
(Continued)

OTHER PUBLICATIONS

U.S. Appl. No. 12/999,353, filed Dec. 16, 2010, Jochen Brill, et al.
(Continued)

*Primary Examiner* — Maria Veronica Ewald
*Assistant Examiner* — Nancy Johnson
(74) *Attorney, Agent, or Firm* — Oblon, McClelland, Maier & Neustadt, L.L.P.

(57) ABSTRACT

The present invention relates to a process for producing polymerized films with line texture or fingerprint texture or for producing substrates coated with polymerized films with line texture or fingerprint texture, to polymerized films, obtainable by this process, with line texture or fingerprint texture or substrates coated with polymerized films with line texture or fingerprint texture, to pigments obtainable by comminuting such films, to the use of such films, substrates or pigments as or in optical filter(s), polarizers, decorative media, forgeryproof markers, reflective media or for focusing light (in solar cells), to the use of such films as an antibacterial coating, to a forgeryproof marker which comprises such a film, and to a process for detecting forgeryproof markings.

21 Claims, 1 Drawing Sheet

(51) Int. Cl.

| | | |
|---|---|---|
| *C09K 19/32* | (2006.01) | |
| *B05D 3/02* | (2006.01) | |
| *B05D 3/06* | (2006.01) | |
| *B05D 5/02* | (2006.01) | |
| *B05D 7/04* | (2006.01) | |
| *B44F 1/10* | (2006.01) | |
| *C09K 19/20* | (2006.01) | |
| *C09K 19/24* | (2006.01) | |
| *C09K 19/54* | (2006.01) | |
| *G01B 11/14* | (2006.01) | |
| *C09K 19/34* | (2006.01) | |
| *C09K 19/04* | (2006.01) | |

(52) U.S. Cl.
CPC . *B05D 5/02* (2013.01); *B05D 7/04* (2013.01); *B44F 1/10* (2013.01); *C09K 19/2007* (2013.01); *C09K 19/24* (2013.01); *C09K 19/3497* (2013.01); *C09K 19/54* (2013.01); *G01B 11/14* (2013.01); *G01B 11/24* (2013.01); *B05D 3/0254* (2013.01); *C09K 19/3405* (2013.01); *C09K 2019/0448* (2013.01); *C09K 2219/03* (2013.01); *Y10T 428/24446* (2015.01)

(56) References Cited

U.S. PATENT DOCUMENTS

| | | | |
|---|---|---|---|
| 7,824,571 B2 | 11/2010 | Ishizaki | |
| 7,931,825 B2 | 4/2011 | Irisawa et al. | |
| 8,197,710 B2 | 6/2012 | Hamada et al. | |
| 2005/0145829 A1 | 7/2005 | Leyrer et al. | |
| 2006/0023157 A1* | 2/2006 | Hammond-Smith et al. | 349/181 |
| 2008/0055521 A1 | 3/2008 | Mizutani et al. | |
| 2011/0097562 A1 | 4/2011 | Brill et al. | |

FOREIGN PATENT DOCUMENTS

| | | |
|---|---|---|
| JP | 2008-179654 | 8/2008 |
| JP | 2008-195762 | 8/2008 |
| WO | WO 00/47694 | 8/2000 |
| WO | WO 03/064559 A1 | 8/2003 |
| WO | WO 2006/002766 A1 | 1/2006 |
| WO | WO 2008/012292 A1 | 1/2008 |
| WO | WO 2009/153168 A1 | 12/2009 |
| WO | WO 2009/153287 A1 | 12/2009 |

OTHER PUBLICATIONS

U.S. Appl. No. 12/996,543, filed Dec. 6, 2010, Olivier Enger, et al.
H. Baessler et al., "Helical Twisting Power of Steroidal Solutes in Cholesteric Mesophases", The Journal of Chemical Physics, vol. 52, Jan. 1-Jun. 15, 1970, 8 pages.

* cited by examiner

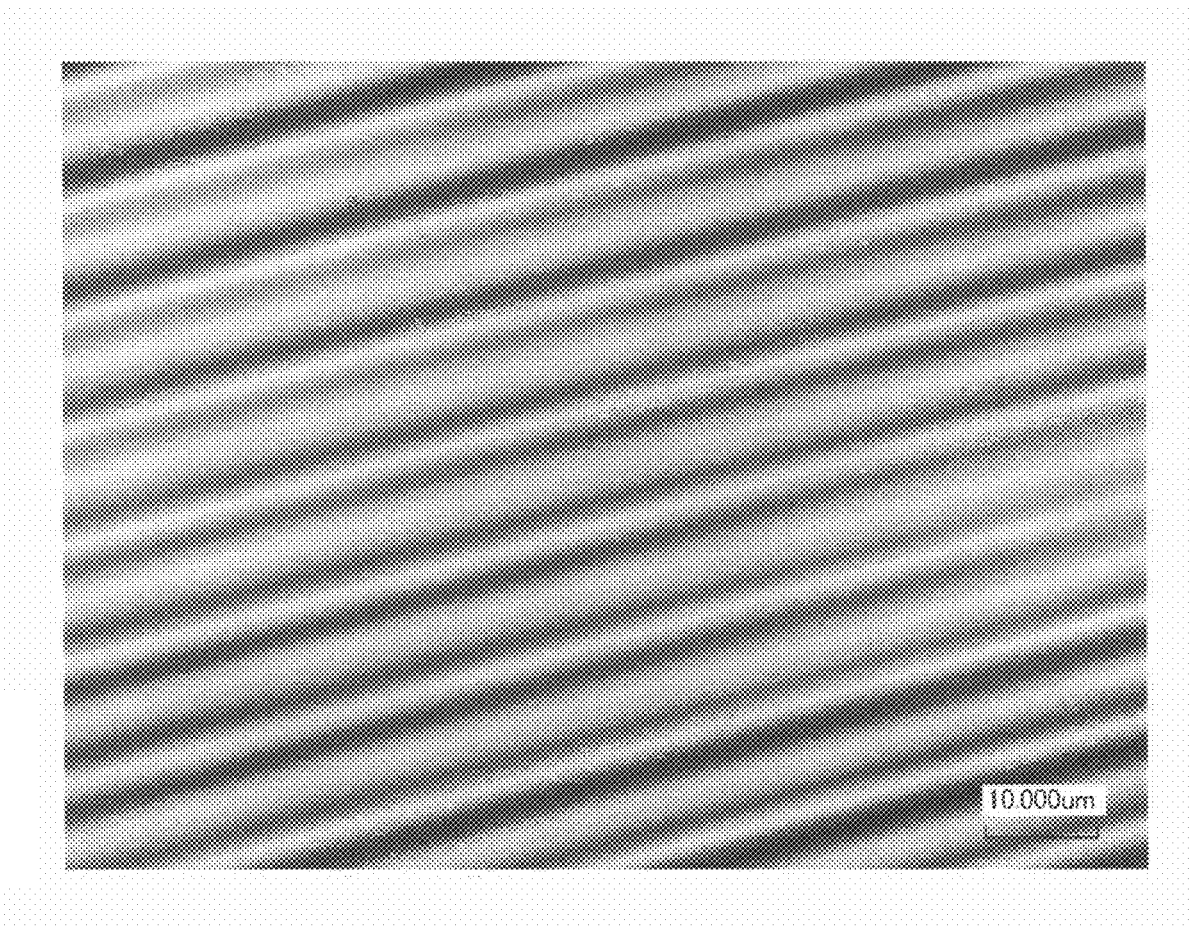

POLYMERIZED FILMS WITH LINE TEXTURE OR FINGERPRINT TEXTURE

The present invention relates to a process for producing polymerized films with line texture or fingerprint texture or for producing substrates coated with polymerized films with line texture or fingerprint texture, to polymerized films, obtainable by this process, with line texture or fingerprint texture or substrates coated with polymerized films with line texture or fingerprint texture, to pigments obtainable by comminuting such films, to the use of such films, substrates or pigments as or in optical filter(s), polarizers, decorative media, forgeryproof markers, reflective media or for focusing light (in solar cells), to the use of such films as an antibacterial coating, to a forgeryproof marker which comprises such a film, and to a process for detecting forgeryproof markings.

The copying and forging or articles of value, such as banknotes, certificates, luxury and brand articles, causes enormous economic damage. In order to put a stop to or at least make life harder for the copiers and forgers, articles of value are regularly provided with forgeryproof markings. However, for most markings, it is merely a matter of time until a way is found to circumvent them. There is therefore a constant need for novel forgeryproof markers.

WO 00/47694 describes the use of particular chiral-nematic polymerizable monomers for producing forgeryproof markings. These are produced by applying the chiral-nematic polymerizable monomers to a suitable substrate, polymerizing, applying a further layer which comprises dyes or pigments which absorb or fluoresce in the IR or UV region to this layer, and then applying a final absorption layer.

WO 2008/012292 describes the use of liquid-crystalline mixtures comprising at least one curable liquid-crystalline component A which reflects in the UV and/or visible wavelength range and, as component B, at least one radiation-absorbing and optionally fluorescent conjugated polycyclic compound, in electrooptical components and/or for the forgeryproof marking of objects, polymers and polymerized films which are produced from such mixtures, and the use thereof in optical filters or as a forgeryproof marker.

When substances with shape anisotropy are heated, liquid-crystalline phases, known as mesophases, can occur. The individual phases differ firstly by the spatial arrangement of the molecules' centers of gravity and secondly by the molecular arrangement with regard to the longitudinal axes (G. W. Gray, P. A. Winsor, Liquid Crystals and Plastic Crystals, Ellis Horwood Limited, Chichester, 1974).

The nematic liquid-crystalline phase features parallel alignment of the longitudinal axes of the molecules (one-dimensional state of order). Provided that the molecules forming the nematic phase are chiral, a so-called chiral nematic (cholesteric) phase forms, in which the longitudinal axes of the molecules form a helix-like superstructure at right angles to them (H. Baessler, Festkörperprobleme XI, 1971). The pitch refers to the distance between two theoretical layers with identical alignment of the longitudinal axes of the molecules.

The chiral molecular moiety may be present either in the liquid-crystalline molecule itself or be added as a dopant to the nematic phase, which induces the chiral nematic phase. This phenomenon was investigated first in cholesterol derivatives (for example H. Baessler, M. M. Labes, J. Chem. Phys. 52, 631 (1970)). By changing the concentration of a chiral dopant, the pitch and hence the wavelength region of selectively reflected radiation of a chiral nematic layer can be varied.

The chiral nematic phase has particular optical properties: high optical rotation and marked circular dichroism, which arises as a result of selective reflection of circular-polarized light within the chiral nematic layer. Such chiral nematic systems offer interesting possibilities for practical use.

Nevertheless, the prior art forgeryproof markers based on chiral nematic compounds are still unsatisfactory.

It was therefore an object of the present invention to provide polymers with novel optical properties, which are suitable for producing optical filters and especially forgeryproof markings. The polymers should additionally be easy to prepare and the forgeryproof marking should be easy to detect.

It has been found that, surprisingly, the thermal treatment of polymeric films during or after polymerizing a composition which comprises an achiral nematic polymerizable monomer leads to the formation of a line texture on the films formed thereby. When the composition also comprises a chiral dopant, a fingerprint texture arises on the surface of the polymer films.

The object is therefore achieved by a process for producing polymerized films with line texture or fingerprint texture or for producing substrates coated with polymerized films with line texture or fingerprint texture, comprising the following steps:

(i) providing an optionally coated carrier film or an optionally coated substrate and optionally cleaning the carrier film or the substrate and/or generating a preferential direction on the film or substrate surface or on part of the film or substrate surface;

(ii) applying a composition comprising at least one achiral nematic polymerizable monomer and optionally at least one dispersion medium to the film or substrate surface; where the composition comprises at least one achiral nematic polymerizable monomer which is polymerizable with UV light, the composition comprising the at least one achiral nematic polymerizable monomer which is polymerizable with UV light in an amount of at least 25% by weight, based on the total weight of the achiral nematic polymerizable monomers present in the composition; and where the composition, in the case that a film with fingerprint texture is to be obtained, also comprises at least one chiral polymerizable monomer;

(iii) optionally aligning the composition applied in step (ii) or part of the composition applied in step (ii);

(iv) at least partly removing the dispersion medium optionally present;

(v) polymerizing the at least one monomer present in the composition under the action of UV light;

(vi) optionally thermally aftertreating the product obtained in step (v); and (vii) optionally post-curing the product obtained in step (v) or (vi) under the action of UV light;

with the proviso that step (vi) is carried out if step (v) is carried out at a temperature of below 60° C.

In a preferred embodiment, step (v) is carried out at elevated temperature.

Thus, in a preferred embodiment, the invention relates to a process A for producing polymerized films with line texture or fingerprint texture or for producing substrates coated with polymerized films with line texture or fingerprint texture, comprising the following steps:

(i) providing an optionally coated carrier film or an optionally coated substrate and optionally cleaning the carrier film or the substrate and/or generating a preferential direction on the film or substrate surface or on part of the film or substrate surface;

(ii) applying a composition comprising at least one achiral nematic polymerizable monomer and optionally at least one dispersion medium to the film or substrate surface; where the composition comprises at least one achiral nematic polymerizable monomer which is polymerizable with UV light, the composition comprising the at least one achiral nematic polymerizable monomer which is polymerizable with UV light in an amount of at least 25% by weight, based on the total weight of the achiral nematic polymerizable monomers present in the composition; and where the composition, in the case that a film with fingerprint texture is to be obtained, also comprises at least one chiral polymerizable monomer;

(iii) optionally aligning the composition applied in step (ii) or part of the composition applied in step (ii);

(iv) at least partly removing the dispersion medium optionally present;

(v) polymerizing the at least one monomer present in the composition under the action of UV light at a temperature of from 60 to 140° C.;

(vi) optionally thermally aftertreating the product obtained in step (v); and (vii) optionally post-curing the product obtained in step (v) or (vi) under the action of UV light.

In an alternatively preferred embodiment, the thermal aftertreatment in step (vi) is carried out.

Thus, in an alternatively preferred embodiment, the invention relates to a process B for producing polymerized films with line texture or fingerprint texture or for producing substrates coated with polymerized films with line texture or fingerprint texture, comprising the following steps:

(i) providing an optionally coated carrier film or an optionally coated substrate and optionally cleaning the carrier film or the substrate and/or generating a preferential direction on the film or substrate surface or on part of the film or substrate surface;

(ii) applying a composition comprising at least one achiral nematic polymerizable monomer and optionally at least one dispersion medium to the film or substrate surface; where the composition comprises at least one achiral nematic polymerizable monomer which is polymerizable with UV light, the composition comprising the at least one achiral nematic polymerizable monomer which is polymerizable with UV light in an amount of at least 25% by weight, based on the total weight of the achiral nematic polymerizable monomers present in the composition; and where the composition, in the case that a film with fingerprint texture is to be obtained, also comprises at least one chiral polymerizable monomer;

(iii) optionally aligning the composition applied in step (ii) or part of the composition applied in step (ii);

(iv) at least partly removing the dispersion medium optionally present;

(v) polymerizing the at least one monomer present in the composition under the action of UV light; and (vi) thermally aftertreating the product obtained in step (v).

Step (vi) can be followed by an optional step (vii), where the product obtained in step (vi) is post-cured under the action of UV light.

Processes A and B differ in the point of time of the thermal treatment, which can take place either during polymerization (process A) or directly after (process B).

The invention additionally also relates to polymerized films with line texture or fingerprint texture and to substrates coated with polymerized films with line texture or fingerprint texture, which are obtainable by the process according to the invention.

The characterizing feature of the inventive polymerized films and substrates is thus that they have a layer with line texture or fingerprint texture (or, in the case of the polymerized film, it may also only consist of one such layer), which is formed from at least one achiral nematic polymerizable monomer in polymerized form, at least one of these nematic monomers being polymerizable with UV light. When the layer has a fingerprint texture, the layer is formed either from at least one achiral nematic polymerizable monomer or from at least one chiral polymerizable monomer in polymerized form.

"Formed from" does not mean that the polymerized layer consists only of the achiral nematic monomer and (to generate the fingerprint texture) optionally the chiral monomer in polymerized form. The composition used in step (ii) may quite possibly also comprise further components (see, for example, components B to E described below), which may also remain partly or fully in the layer formed after step (v), (vi) or (vii).

In the context of the present invention, "line texture" is understood to mean surface characteristics which appear, when viewed under the microscope from the top, as a system of substantially parallel lines or strips of infinite longitudinal extent (the longitudinal extent is of course limited by the end of the film). "Substantially" expresses that the texture may to a minor degree also comprise defects which can disrupt the parallelism or the infinity of the extent of the lines or strips within the polymer film. When viewed from the side, the surface under the microscope appears as a chain of mountains and valleys (virtually sinusoidal). This can also be detected using surface measurements, such as atomic force measurements or scanning measurements, or optical imaging processes.

"Fingerprint texture" is understood in the context of the present invention to mean surface characteristics which appear, when viewed from the top under the microscope, as a system of lines or strips reminiscent of a fingerprint or a snake's skin.

The term "liquid-crystalline" is used in the context of the present invention both for nematic and for cholesteric phases, unless otherwise evident from the particular context.

The inventive film may be either a foil, i.e. a self-supporting flat structure, i.e. a structure with a thickness of not more than 5 mm, preferably not more than 3 mm, more preferably not more than 1.5 mm and especially not more than 1 mm, the thickness of which is also negligibly small compared to length and width, for example by a factor of at least 20 or at least 50 or at least 100 or at least 500 less than the next greatest dimension, and which is simultaneously also flexible, or a non-self-supporting flat structure which requires a carrier in order not to tear, for example a carrier film or a substrate of any nature.

In the context of the present invention, crosslinking is understood to mean the covalent formation of polymeric bonds, and polymerization to mean the covalent formation of monomeric bonds, to polymers. Hardening or curing is understood to mean crosslinking, polymerization or the freezing of the cholesteric phase. Hardening fixes the homogeneous alignment of the cholesteric molecules in the liquid-crystalline layer. "Post-curing" relates to a curing or hardening step which is carried out after the actual crosslinking step of the polymer has already been completed, and which serves for further completing crosslinking, polymerization or the freezing of the cholesteric phase.

The remarks which follow regarding preferred features of the process according to the invention, especially of the obligatorily and optionally used components and the obligatorily and optionally performed process steps, of the inventive films, substrates and markers apply both taken alone and more particularly in combination with one another. If not explicitly stated differently, the remarks made with respect to the process are valid for the general process as well as for variants A and B. The remarks which follow relate both to the process according to the invention and to the inventive product. The inventive product may comprise the inventive polymerized films or the inventive substrate, although, as explained below, it is not always possible to strictly separate them.

In the process of the invention the temperature of step (v) is principally not critical if step (vi) is carried out, and can be, for example, distinctly below 60° C. The maximum temperature is determined by the thermal stability of the monomers to be polymerized and of the forming film or substrates on which the film is formed and should not exceed 150° C. and preferably should not exceed 140° C. In case step (vi) is carried out, step (v) is preferably carried out at ambient temperature, i.e. at a temperature which is determined by the UV light source and the environment in which polymerization is carried out. As a rule, this is at most 75° C., preferably at most 60° C. and in particular at most 50° C. Independently of whether step (vi) is carried out or not, it is however more preferred to carry out step (v) at a temperature of from 60 to 140° C., more preferably from 80 to 120° C., even more preferably from 80 to 110° C., particularly preferably from 90 to 110° C., in particular from 95 to 105° C. and specifically at approximately 100° C. If step (vi) is not carried out, the polymerization in step (vi) is carried out at a temperature of preferably from 60 to 140° C., more preferably from 80 to 120° C., even more preferably from 80 to 110° C., particularly preferably from 90 to 110° C., in particular from 95 to 105° C. and specifically at approximately 100° C.

The thermal energy can originate both from an external heat source as well as from the UV light source, for example a UV lamp. Preferably the thermal energy originates at least partly from a heat source different from the UV light source, for example from an oven or a heating plate.

In process variant A step (v) is preferably carried out at a temperature of from 60 to 140° C., more preferably from 80 to 120° C., even more preferably from 80 to 110° C., particularly preferably from 90 to 110° C., in particular from 95 to 105° C. and specifically at approximately 100° C. The thermal energy can originate both from an external heat source as well as from the UV light source, for example a UV lamp. Preferably the thermal energy originates at least partly from a heat source different from the UV light source, for example from an oven or a heating plate.

In process variant B the temperature of step (v) is principally not critical if step (vi) is carried out, and can be, for example, distinctly below 60° C. The maximum temperature is determined by the thermal stability of the monomers to be polymerized and of the forming film or substrates on which the film is formed and should not exceed 150° C. and preferably should not exceed 140° C. In case step (vi) is carried out, step (v) is preferably carried out at ambient temperature, i.e. at a temperature which is determined by the UV light source and the environment in which polymerization is carried out. As a rule, this is at most 75° C., preferably at most 60° C. and in particular at most 50° C. However, also for process B is it more preferred to carry out step (v) at a temperature of from 60 to 140° C., more preferably from 80 to 120° C., even more preferably from 80 to 110° C., particularly preferably from 90 to 110° C., in particular from 95 to 105° C. and specifically at approximately 100° C.

The temperatures given above relate to the temperature in immediate proximity of the polymerizing film.

In the thermal aftertreatment in step (vi), preference is given to introducing a particular amount of energy into the product obtained in step (v). The energy is preferably introduced by exposing the product to an elevated temperature for a particular time, for example by introducing into or passing through an oven. The duration depends on the temperature to which the product is exposed (the lower the temperature, the longer the time required to introduce the desired amount of energy into the product), though it has been found to be useful to select higher temperatures rather than long action times. What temperature and duration are required to introduce a particular amount of energy into the product depends in turn on the heat capacity and the thermal conductivity of the product.

In the thermal aftertreatment in step (vi) preference is given to exposing the product obtained in step (v) to a temperature of 60 to 220° C. for 1 second to 5 minutes, more preferably a temperature of 70 to 180° C. for 5 seconds to 3 minutes, even more preferably a temperature of 70 to 150° C. for 5 seconds to 1 minute and especially a temperature of 100 to 135° C. for 5 to 40 seconds. Alternatively, it is possible to use any desired process with which a comparable amount of energy is introduced into the product obtained in step (v). However, preference is given to exposing the product to an elevated temperature.

In process variant A optional step (vi) is not mandatory for obtaining a line texture or fingerprint texture so that in a particular embodiment this step can be dispensed with, especially if step (v) is carried out at a temperature of at least 80° C., e.g. of from 80 to 110° C., in particular at least 90° C., e.g. of from 90 to 110° C., and specifically at least 95° C., e.g. of from 95 to 110° C. or approximately at 100° C.

In optional step (vii) the product obtained in step (v) or (vi) is post-cured, i.e. it is subjected to a further hardening or crosslinking. For this purpose the product is irradiated with UV light, preferably after cooling to a temperature of from 20 to 50° C., preferably 20 to 40° C. The irradiation time should preferably not exceed 5 minutes, and should more preferably not exceed 3 minutes.

By this step (vii) the storage stability of the films with line texture or fingerprint texture is distinctly enhanced and their sensitivity to thermal deterioration is significantly reduced.

In the case that the composition used in step (ii) comprises no chiral dopants, especially no chiral polymerizable monomers, and of course no cholesteric compounds either, especially no cholesteric polymerizable monomers, but rather, as the sole liquid-crystalline compound, at least one achiral nematic polymerizable monomer, the thermal treatment in step (v) or the thermal aftertreatment in step (vi) affords a polymerized film with line texture. However, it is a prerequisite that at least one of the achiral nematic polymerizable monomers present in the composition is polymerizable by UV light, and this at least one monomer polymerizable by UV light is present in the composition in a total amount of at least 25% by weight, preferably at least 50% by weight and especially at least 60% by weight, based on the total weight of the achiral nematic polymerizable monomers present in the composition.

In the case that the composition used in step (ii) also comprises at least one chiral dopant, especially at least one chiral polymerizable material, the thermal treatment in step (v) or the thermal aftertreatment in step (vi) affords a polymerized film with fingerprint texture.

In a preferred embodiment, the process according to the invention serves to produce polymerized films with line texture, i.e. the composition used in step (ii) preferably comprises, as the sole liquid-crystalline compound, at least one achiral nematic polymerizable monomer and no chiral dopant, more particularly no chiral polymerizable monomer, and of course no cholesteric polymerizable monomer either. Accordingly, the inventive product is a polymerized film or a substrate, which have a layer with line texture.

Preferably, at least one achiral nematic polymerizable monomer of the composition used in step (ii) is polyfunctionally and especially difunctionally polymerizable. Preferred achiral nematic difunctionally polymerizable monomers correspond to the general formula I

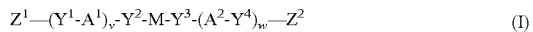

$$Z^1-(Y^1-A^1)_v-Y^2-M-Y^3-(A^2-Y^4)_w-Z^2 \qquad (I)$$

in which
$Z^1$, $Z^2$ are identical or different reactive groups through which polymerization can be effected, or radicals which comprise such reactive groups, where the reactive groups are selected from C=C double bonds, C≡C triple bonds, oxirane, thiirane, azirane, cyanate, thiocyanate, isocyanate, carboxylic acid, hydroxyl or amino groups, and preferably from C=C double bonds;
$Y^1$, $Y^2$, $Y^3$, $Y^4$ are each independently a chemical bond, —O—, —S—, —CO—O—, —O—CO—, —O—CO—O—, —CO—S—, —S—CO—, —CO—N($R^a$)—, —N($R^a$)—CO—, —N($R^a$)—CO—O—, —O—CO—N($R^a$)—, —N($R^a$)—CO—N($R^a$)—, —CH$_2$—O—, —O—CH$_2$—, preferably —CO—O—, —O—CO— or —O—CO—O—,
where $R^a$ is hydrogen or $C_1$-$C_4$-alkyl;
$A^1$, $A^2$ are identical or different spacers selected from linear $C_2$-$C_{30}$-alkylene groups, preferably $C_2$-$C_{12}$-alkylene groups, which may be interrupted by oxygen, sulfur and/or optionally monosubstituted nitrogen, where these interrupting groups must not be adjacent; where suitable amine substituents comprise $C_1$-$C_4$-alkyl groups, where the alkylene chains may be substituted by fluorine, chlorine, bromine, cyano, methyl or ethyl; and where, more preferably, $A^1$ and $A^2$ are each —(CH$_2$)$_n$— where n=2 to 8;
v and w are each independently 0, 1 or 2;
M is a mesogenic group of the general formula II:

$$(T^1-Y^5)_y-T^2 \qquad (II)$$

in which
each $T^1$ is independently an optionally substituted divalent alicyclic, saturated or partially unsaturated heterocyclic, aromatic or heteroaromatic radical;
$T^2$ is independently as defined for $T^1$ or is a —CH=N—N=CH— group;
$Y^5$ is identical or different bridging members —CO—O—, —O—CO—, —CH$_2$—O—, —O—CH$_2$—, —CO—S—, —S—CO—, —CH$_2$—S—, —S—CH$_2$—, —CH=N—, —N=CH—, —CH=N—N=CH—, —CH=CH—, —C(CH$_3$)=CH$_2$—, —CH=CH(CH$_3$)— or a direct bond, and
y is 0, 1, 2 or 3, preferably 0, 1 or 2, particularly 1 or 2 and especially 2.
$T^2$ is preferably an optionally substituted divalent aromatic radical and more preferably an optionally substituted phenyl radical, or $T^2$ is an optionally substituted divalent 5- or 6-membered heteroaromatic radical having 1, 2 or 3 heteroatoms selected from N, O and S as ring members, or a —CH=N—N=CH— group.

$T^2$ is more preferably a radical of the formula

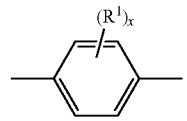

in which
$R^1$ is fluorine, chlorine, bromine, $C_{1-6}$-alkyl, $C_{1-6}$-alkoxy, $C_{1-6}$-alkylcarbonyl, $C_{1-6}$-alkylcarbonyloxy, $C_{1-6}$-alkoxycarbonyl, hydroxyl, nitro, CHO or CN, preferably chlorine, bromine, $C_1$-$C_4$-alkyl or $C_1$-$C_4$-alkoxycarbonyl, and especially methyl or methoxycarbonyl; and
x is 0, 1, 2, 3 or 4, preferably 0, 1 or 2, more preferably 0 or 1 and especially 1;
or $T^2$ is a divalent 5- or 6-membered heteroaromatic radical having 1, 2 or 3 heteroatoms selected from N, O and S as ring members, which may bear 1 or 2 substituents selected from $C_{1-6}$-alkyl and $C_{1-6}$-alkoxy, or $T^2$ is a —CH=N—N=CH— group.

Suitable divalent 5- or 6-membered heteroaromatic radicals are, for example, 2,5-pyrrolediyl, 3,4-pyrrolediyl, 3,4-pyrazolediyl, 2,5-imidazolediyl, 2,5-triazolediyl, 3,4-triazolediyl, 2,5-oxadiazolediyl, 2,5-thiadiazolediyl, 2,5-pyridinediyl, 2,5-pyrimidinediyl and the like.

Each $T^1$ is preferably independently an aromatic radical, more preferably phenyl or naphthyl and especially 1,4-bonded phenyl or 2,6-bonded naphthyl, where the aromatic radical may bear 1 or 2 substituents selected from $C_{1-6}$-alkyl and $C_{1-6}$-alkoxy.
$Y^5$ is preferably —CO—O— or —O—CO— when $T^2$ is not a —CH=N—N=CH— group. When $T^2$ is a —CH=N—N=CH— group, $Y^5$ is preferably a chemical single bond.
y is preferably 2.

More preferably, the at least one achiral nematic polymerizable monomer used in step (ii) comprises at least one difunctionally polymerizable achiral nematic monomer of the formula I.1

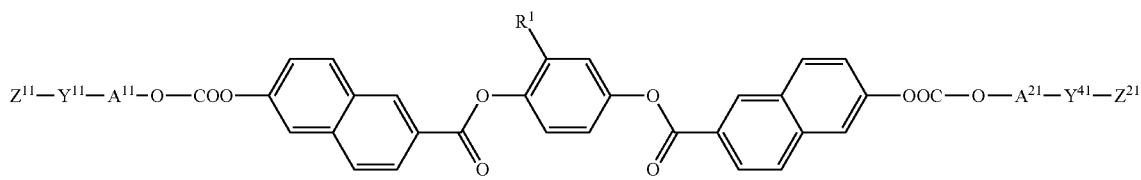

I.1 in which
$Z^{11}$ and $Z^{21}$ are each independently

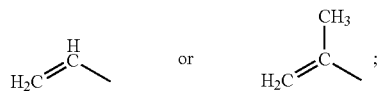

$A^{11}$ and $A^{21}$ are each independently alkylene groups having 2 to 8 carbon atoms,
$Y^{11}$ and $Y^{41}$ are each independently a chemical single bond, oxygen, —CO—, —O—CO— or —CO—O—; and
$R^1$ is hydrogen, $C_1$-$C_6$-alkyl, $C_1$-$C_6$-alkoxy or CO—O—$C_1$-$C_6$-alkyl;
and optionally additionally at least one difunctionally polymerizable achiral nematic monomer of the formula I.2 is a divalent 5- or 6-membered heteroaromatic radical having 1, 2 or 3 heteroatoms selected from N, O and S as ring members, or is a —CH=N—N=CH— group;

$Z^{12}$ and $Z^{22}$ are each independently

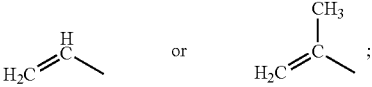

$A^{12}$ and $A^{22}$ are each independently alkylene groups having 2 to 8 carbon atoms,
$Y^{12}$ and $Y^{42}$ are each independently a chemical single bond, oxygen, —CO—, —O—CO— or —CO—O—;
$Y^{52}$ is a chemical single bond, oxygen, —CO—, —O—CO— or —CO—O—, with the proviso that $Y^{52}$ is a chemical single bond when $T^{22}$ is a —CH=N—N=CH— group;
$R^2$ is hydrogen, $C_1$-$C_6$-alkyl, $C_1$-$C_6$-alkoxy or CO—O—$C_1$-$C_6$-alkyl; and
$R^3$ is hydrogen, $C_1$-$C_6$-alkyl, $C_1$-$C_6$-alkoxy or CO—O—$C_1$-$C_6$-alkyl.

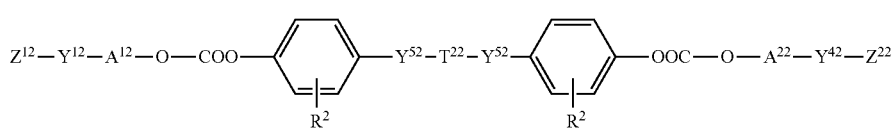

I.2 in which
$T^{22}$ is a divalent radical of the formula

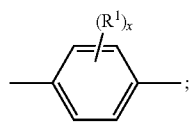

In the case that the at least one achiral nematic polymerizable monomer used in step (ii) also comprises at least one difunctionally polymerizable achiral nematic monomer of the formula I.2, the total weight ratio of the at least one monomer of the formula I.1 to the at least one monomer of the formula I.2 is preferably at least 1:1, more preferably at least 6:5, even more preferably at least 3:2 and especially at least 4:3.

In particular, the monomer I.1 used is a compound of the formula I.1.1

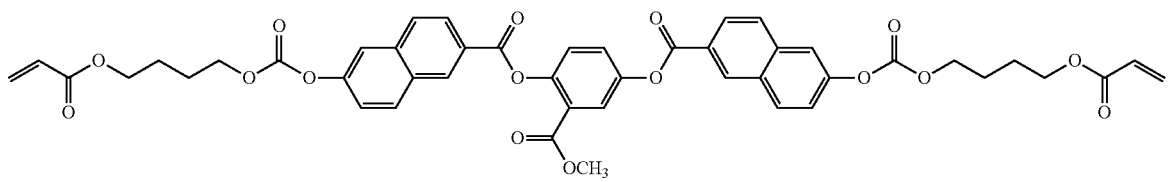

I.1.1

More particularly, the at least one monomer I.2 is selected from compounds of the formulae I.2.1, I.2.2, I.2.3 and I.2.4, and mixtures thereof

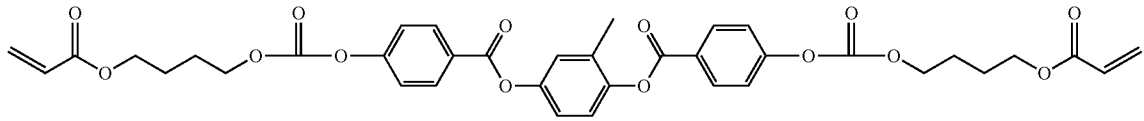

(I.2.1)

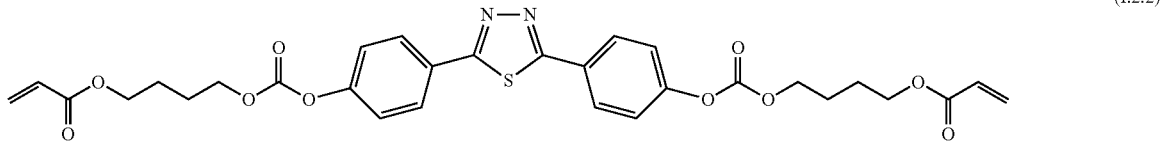

(I.2.2)

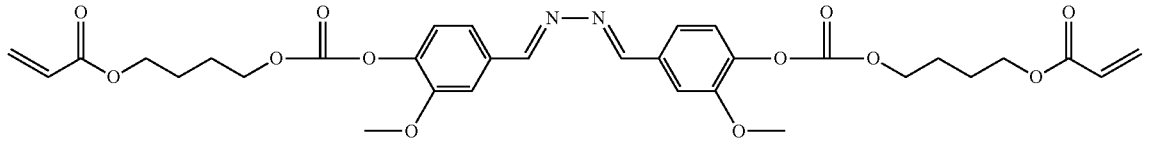

(I.2.3)

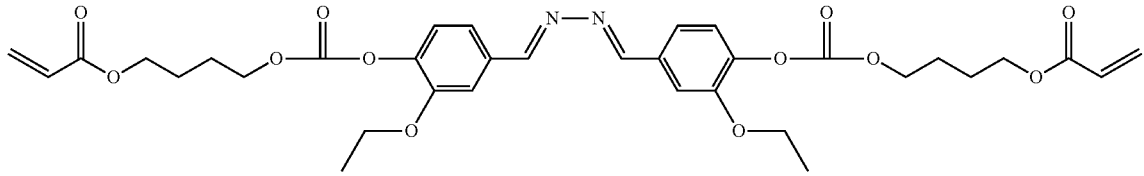

(I.2.4)

Even more preferably, the at least one monomer I.2 is selected from compounds of the formulae I.2.1 and I.2.2, and mixtures thereof.

The composition used in step (ii) comprises the at least one achiral nematic polymerizable monomer in an amount of preferably at most 50% by weight, for example of 5 to 50% by weight, preferably of 10 to 50% by weight, more preferably of 15 to 50% by weight and especially of 20 to 50% by weight, more preferably of at most 30% by weight, for example of 5 to 30% by weight, preferably of 10 to 30% by weight, more preferably of 15 to 30% by weight and especially of 20 to 30% by weight, and especially of at most 25% by weight, for example of 5 to 25% by weight, preferably of 10 to 25% by weight, more preferably of 15 to 25% by weight and especially of 20 to 25% by weight, based on the total weight of the composition.

When the composition used in step (ii) also comprises a chiral polymerizable monomer, this preferably corresponds to the formula IV

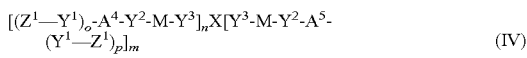  (IV)

in which $Z^1, Y^1, Y^2, Y^3$ and M each have one of the general or preferred definitions specified above for formula (I) (though $T^2$ in the M group is not a —CH═N—N═CH— group), o, p are each 0 or 1, where o and p must not both be 0, $A^4$ and $A^5$ are the same or different; and $A^4$ is as defined for $A^1$ when o=1; or, when o=0, is a linear $C_1$-$C_{30}$-alkyl group, preferably $C_1$-$C_{12}$-alkyl group, which may be interrupted by oxygen, sulfur and/or optionally monosubstituted nitrogen, where these interrupting groups must not be adjacent; where suitable amine substituents comprise $C_1$-$C_4$-alkyl groups, where the alkyl groups may be substituted by fluorine, chlorine, bromine, cyano, methyl or ethyl, and where $A^4$ is more preferably $CH_3(CH_2)_l$— groups where l=1 to 7;

$A^5$ is as defined for $A^1$ when p=1; or, when p=0, is a linear $C_1$-$C_{30}$-alkyl group, preferably $C_1$-$C_{12}$-alkyl group, which may be interrupted by oxygen, sulfur and/or optionally monosubstituted nitrogen, where these interrupting groups must not be adjacent; where suitable amine substituents comprise $C_1$-$C_4$-alkyl groups, where the alkyl groups may be substituted by fluorine, chlorine, bromine, cyano, methyl or ethyl, and where $A^5$ is more preferably $CH_3(CH_2)_l$— groups where l=1 to 7;

n, m are each 0, 1 or 2, where the sum of n+m is 1 or 2, preferably 2; and

X is a chiral radical.

The mesogenic M groups preferably have the formula III $$(T^1\text{-}Y^5)_y\text{-}T^2 \quad (III)$$

in which $T^1$, $T^2$ and $Y^5$ each have one of the general or preferred definitions specified above (though $T^2$ is not a —CH═N—N═CH— group). y has one of the general definitions specified above, but is preferably 0 or 1.

$T^2$ is preferably an aromatic radical and more preferably a phenyl radical. More particularly, $T^2$ is a radical of the formula

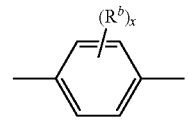

in which $R^b$ is fluorine, chlorine, bromine, $C_1$-$C_{20}$-alkyl, $C_1$-$C_{10}$-alkoxy, $C_1$-$C_{10}$-alkylcarbonyl, $C_1$-$C_{10}$-alkylcarbonyloxy, $C_1$-$C_{10}$-alkoxycarbonyl, hydroxyl, nitro, CHO or CN, preferably chlorine, bromine, $C_1$-$C_4$-alkyl or $C_1$-$C_4$-alkoxycarbonyl, and especially methyl or methoxycarbonyl; and x is 0, 1, 2, 3 or 4, preferably 0, 1 or 2, more preferably 0 or 1 and especially 0.

Each $T^1$ is preferably independently an aromatic radical, more preferably phenyl or naphthyl, even more preferably 1,4-bonded phenyl or 2,6-bonded naphthyl, and especially unsubstituted 1,4-bonded phenyl or unsubstituted 2,6-bonded naphthyl.

$Y^5$ is preferably —CO—O— or —O—CO—.

y is preferably 0 or 1.

Among the chiral X radicals of the compounds of the general formula IV, owing to the easier availability among other reasons, preference is given especially to those which derive from sugars, dinaphthyl or diphenyl derivatives and optically active glycols, alcohols or amino acids. In the case of the sugars, mention should be made especially of pentoses and hexoses, and derivatives derived therefrom.

Examples of X radicals are the following structures, where the terminal dashes each denote the free valences.

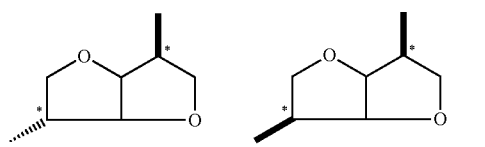

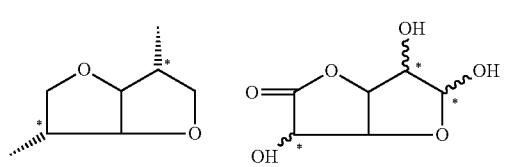

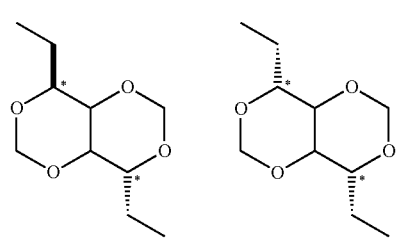

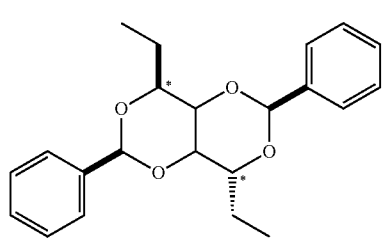

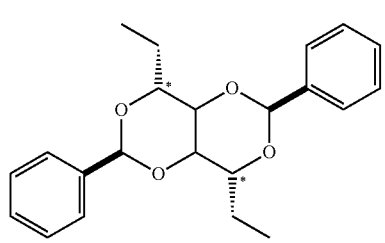

-continued

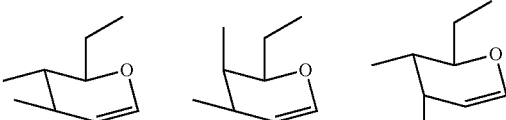

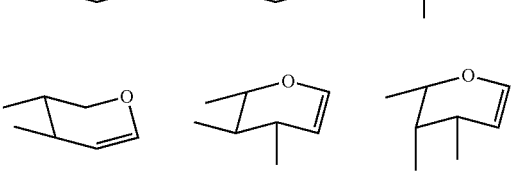

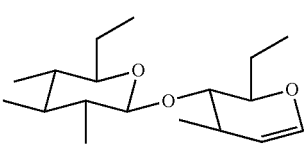

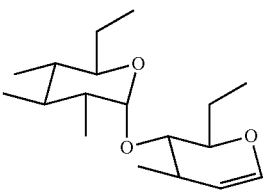

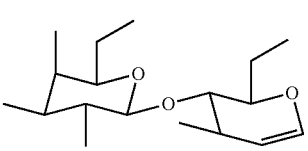

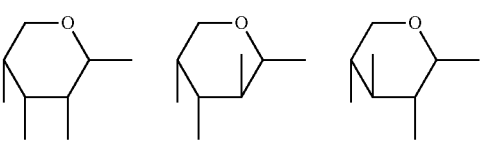

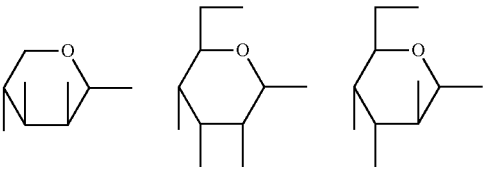

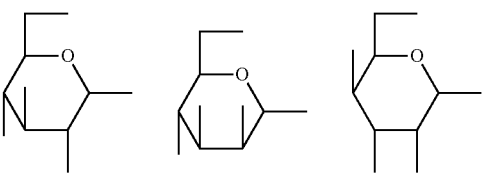

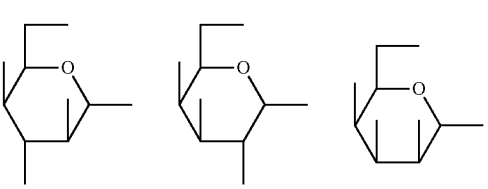

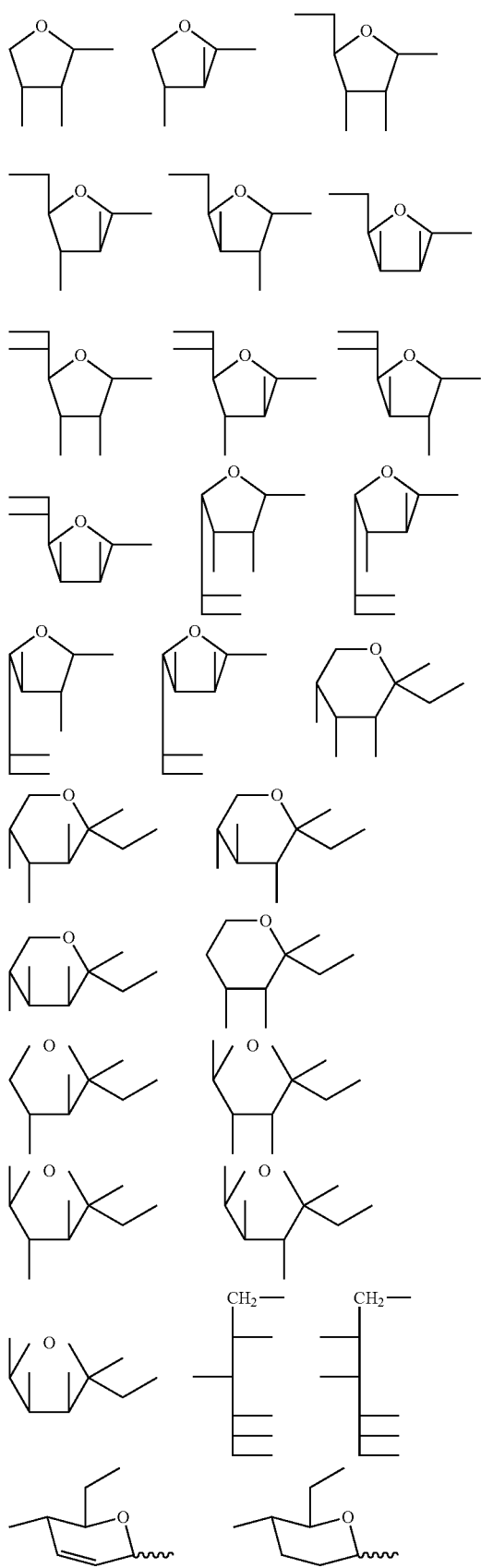
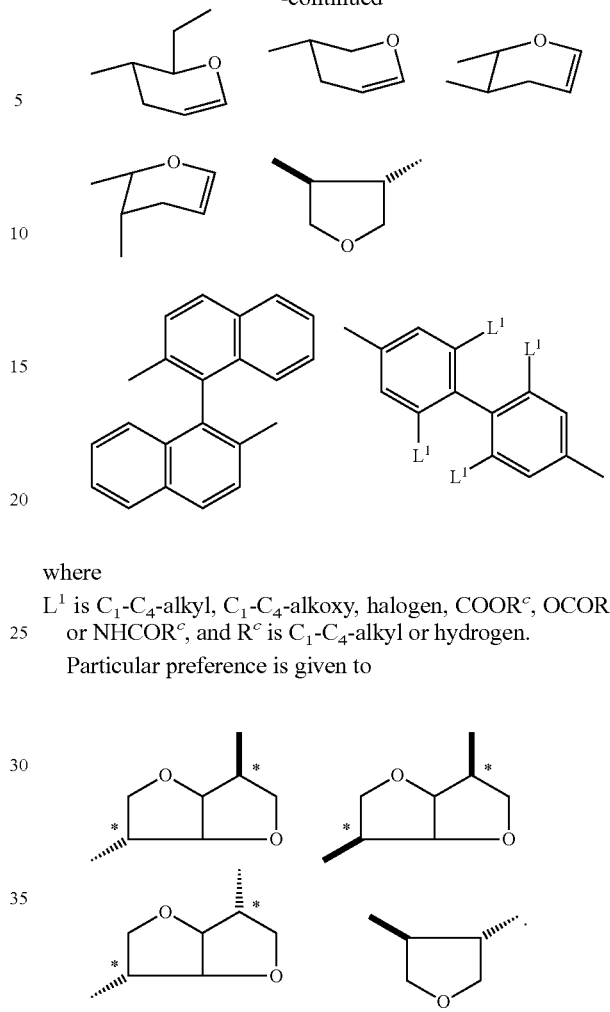

where
L$^1$ is C$_1$-C$_4$-alkyl, C$_1$-C$_4$-alkoxy, halogen, COOR$^c$, OCOR$^c$ or NHCOR$^c$, and R$^c$ is C$_1$-C$_4$-alkyl or hydrogen.

Particular preference is given to

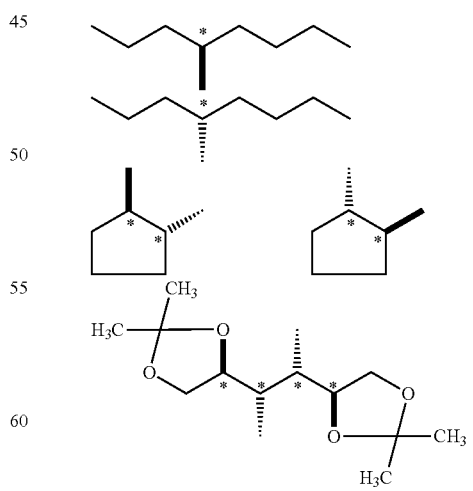

In addition, chiral groups which have the following structures are also suitable:

In a particularly preferred embodiment, the chiral polymerizable monomer is selected from the following structural formulae

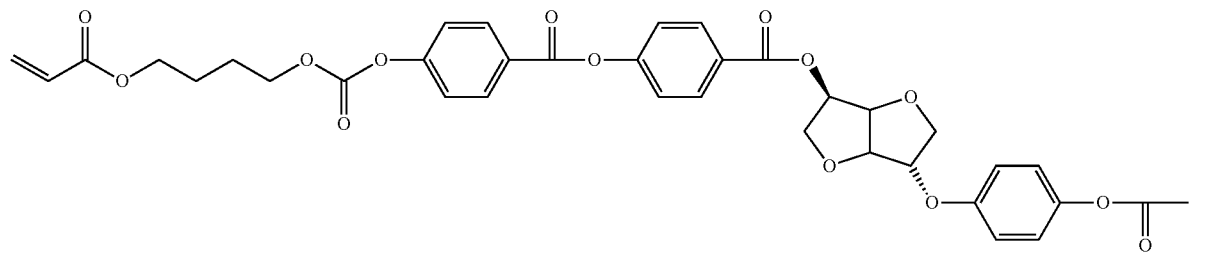
IV.a
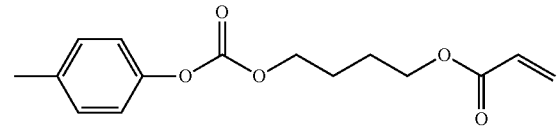
IV.b
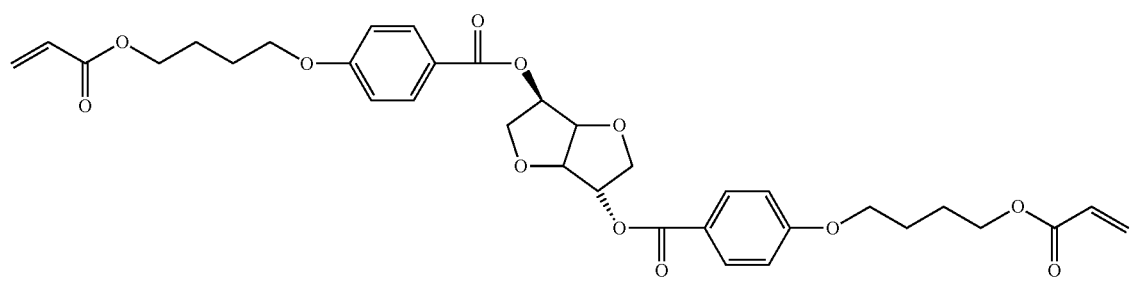
IV.c
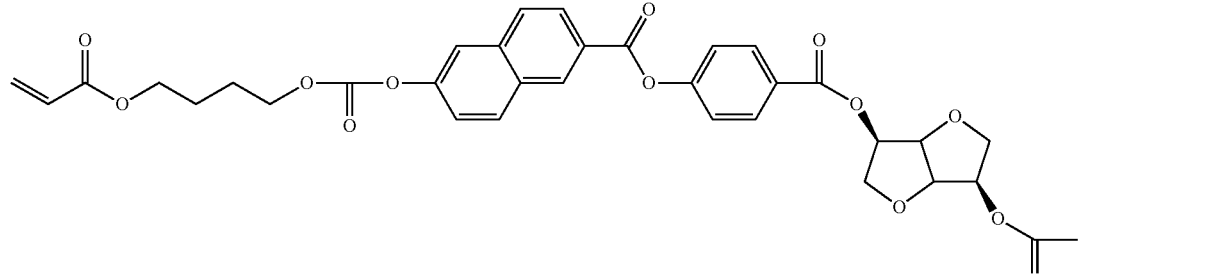
IV.d
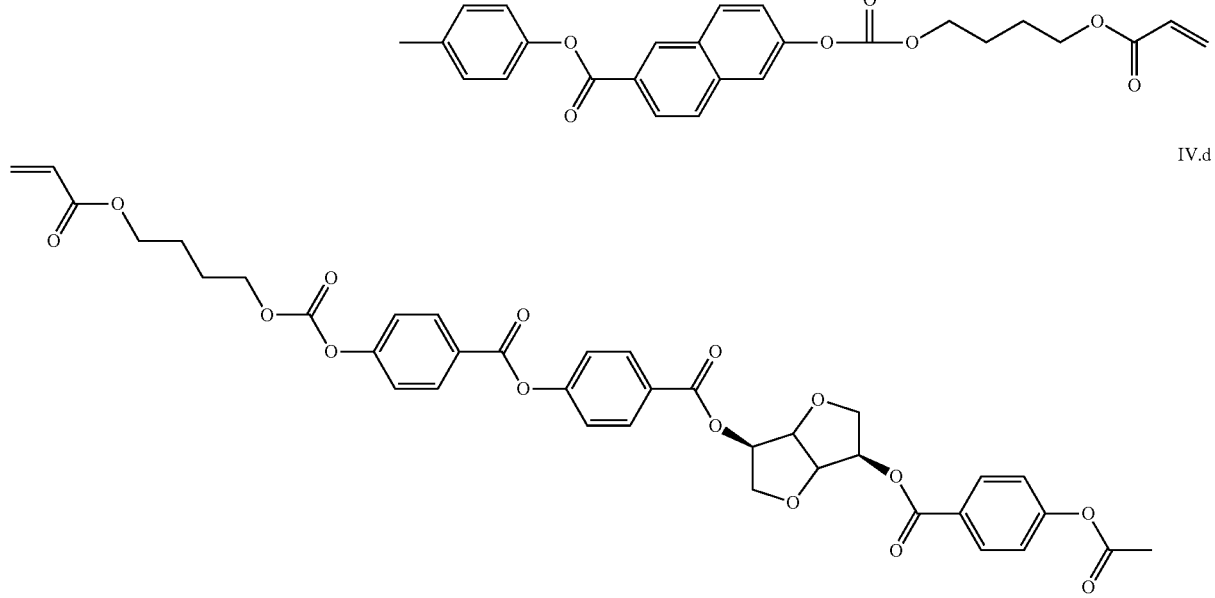

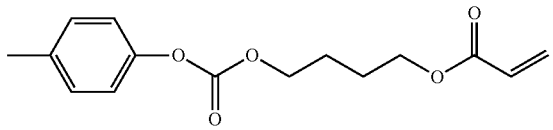

IV.e

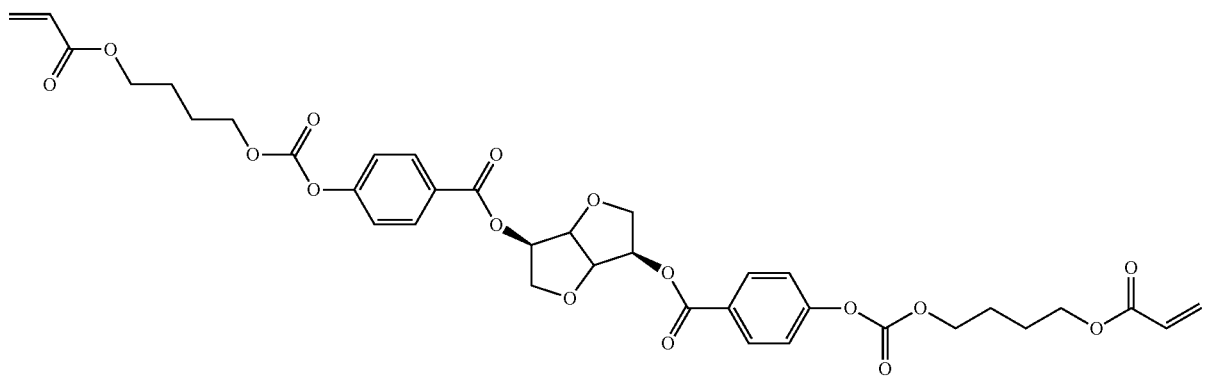

When the composition used in step (ii) comprises at least one chiral polymerizable monomer, the ratio of the total amount of the at least one achiral nematic monomer to the at least one chiral monomer in the composition is selected such that the polymer formed from these monomers, after the alignment, has a pitch of the helical superstructure which corresponds to the desired wavelength which is to be reflected, for example a wavelength in the UV spectral region or a wavelength in the visible spectral region or a wavelength in the IR spectral region. The ratio depends on the type of the nematic and chiral monomers and has to be determined from individual case to individual case. This can be done in simple preliminary experiments.

However, it is generally the case that, given a particular nematic monomer and a particular chiral monomer, with increasing concentration of the chiral component compared to the nematic component, the maximum of the reflection band moves to shorter wavelengths.

The composition used in step (ii), however, preferably does not comprise any chiral polymerizable monomer.

If desired, the composition used in step (ii) may comprise, as well as the components already mentioned, further mixture constituents which are preferably selected from
at least one component B which is in turn selected from
(B.1) photoinitiators;
(B.2) reactive diluents which comprise photopolymerizable groups;
(B.3) defoamers and deaerators;
(B.4) lubricants and leveling agents;
(B.5) thermally curing and/or radiation-curing assistants;
(B.6) substrate wetting aids;
(B.7) wetting and dispersing aids;
(B.8) hydrophobizing agents;
(B.9) adhesion promoters; and
(B.10) assistants for improving the scratch resistance;
at least one component C which is in turn selected from
(C.1) dyes; and
(C.2) pigments;
at least one component D which is in turn selected from
light, heat and oxidation stabilizers; and
at least one component E which is in turn selected from
IR-absorbing compounds.

In principle, it is possible to use customary photoinitiators, for example isobutyl benzoin ether, 2,4,6-trimethylbenzoyl-diphenylphosphine oxide, 1-hydroxycyclohexyl phenyl ketone, 2-benzyl-2-dimethylamino-1-(4-morpholinophenyl)furan-1-one, mixtures of benzophenone and 1-hydroxycyclohexyl phenyl ketone, 2,2-dimethoxy-2-phenyl-acetophenone, perfluorinated diphenyltitanocenes, 2-methyl-1-(4-[methylthio]phenyl)-2-(4-morpholinyl)-1-propanone, 2-hydroxy-2-methyl-1-phenylpropan-1-one, 4-(2-hydroxyethoxy)phenyl 2-hydroxy-2-propyl ketone, 2,2-diethoxyacetophenone, 4-benzoyl-4'-methyldiphenyl sulfide, ethyl 4-(dimethylamino)benzoate, mixtures of 2-isopropylthioxanthone and 4-isopropylthioxanthone, 2-(dimethylamino)ethyl benzoate, d,l-camphorquinone, ethyl-d,l-camphorquinone, mixtures of benzophenone and 4-methylbenzophenone, benzophenone, 4,4'-bis(dimethylamine)benzophenone, ($\eta^5$-cyclopentadienyl) ($\eta^6$-isopropylphenyl)iron(II) hexafluorophosphate, triphenylsulfonium hexafluorophosphate or mixtures of triphenylsulfonium salts, and butanediol diacrylate, dipropylene glycol diacrylate, hexanediol diacrylate, 4-(1,1-dimethylethyl)cyclohexyl acrylate, trimethylolpropane triacrylate and tripropylene glycol diacrylate.

Commercial photoinitiators (B.1) suitable in principle are, for example, those which are commercially available under the Lucirin®, Irgacure® and Darocure® brand names. Examples are Lucirin® TPO, Lucirin® TPO-L, Irgacure® Oxe 01, Irgacure® Oxe 02, Irgacure® 1300, Irgacure® 184, Irgacure® 369, Irgacure® 907 and Darocure® 1173.

The reactive diluents used are not only those substances which are referred to as reactive diluents in the actual sense (group B.2.1), but also auxiliary compounds which comprise one or more complementary reactive units, for example hydroxyl or amino groups, through which a reaction with the polymerizable units of the liquid-crystalline compounds can be effected (group B.2.2).

The substances of group (B.2.1) which are typically capable of photopolymerization include, for example, mono-, bi- or polyfunctional compounds having at least one olefinic double bond. Examples thereof are vinyl esters of carboxylic acids, for example of lauric acid, myristic acid, palmitic acid or stearic acid, or of dicarboxylic acids, for example of succinic acid and adipic acid, allyl or vinyl ethers or methacrylic or acrylic esters of monofunctional alcohols, for example of lauryl alcohol, myristyl alcohol, palmityl alcohol or stearyl alcohol, or diallyl or divinyl ethers of bifunctional alcohols, for example of ethylene glycol and of butane-1,4-diol.

Further useful examples are methacrylic or acrylic esters of polyfunctional alcohols, especially those which, as well as the hydroxyl groups, comprise no further functional groups or, at most, ether groups. Examples of such alcohols are, for example, bifunctional alcohols such as ethylene glycol, propylene glycol, and their more highly condensed representatives, for example diethylene glycol, triethylene glycol, dipropylene glycol, tripropylene glycol, etc., butanediol, pentanediol, hexanediol, neopentyl glycol, alkoxylated phenolic compounds such as ethoxylated or propoxylated bisphenols, cyclohexanedimethanol, trifunctional and higher-functionality alcohols such as glycerol, trimethylolpropane, butanetriol, trimethylolethane, pentaerythritol, ditrimethylolpropane, dipentaerythritol, sorbitol, mannitol and the corresponding alkoxylated, especially ethoxylated and propoxylated, alcohols.

Further useful reactive diluents of group (B.2.1) are polyester (meth)acrylate, which are the (meth)acrylic esters of polyesterols.

Useful polyesterols include, for example, those which can be prepared by esterifying polycarboxylic acids, preferably dicarboxylic acids, with polyols, preferably diols. The starting materials for such hydroxyl-containing polyesters are known to those skilled in the art. The dicarboxylic acids used may be succinic acid, glutaric acid, adipic acid, sebacic acid, o-phthalic acid, and their isomers and hydrogenation products, and also esterifiable or transesterifiable derivatives of the acids mentioned, for example anhydrides or dialkyl esters. Useful polyols include the abovementioned alcohols, preferably ethylene glycol, 1,2- and 1,3-propylene glycol, 1,4-butanediol, 1,6-hexanediol, neopentyl glycol, cyclohexanedimethanol and polyglycols of the ethylene glycol and propylene glycol type.

Also useful as reactive diluents of group (B.2.1) are 1,4-divinylbenzene, triallyl cyanurate, acrylic esters of tricyclodecenyl alcohol of the following formula

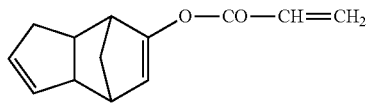

also known by the name dihydrodicyclopentadienyl acrylate, and the allyl esters of acrylic acid, of methacrylic acid and of cyanoacrylic acid.

Among the reactive diluents of group (B.2.1) mentioned by way of example, those used are especially, with regard to the preferred inventive mixtures addressed above those which comprise photopolymerizable groups.

The group (B.2.2) includes, for example, di- or polyhydric alcohols, for example ethylene glycol, propylene glycol, and their more highly condensed representatives, for example diethylene glycol, triethylene glycol, dipropylene glycol, tripropylene glycol, etc., butanediol, pentanediol, hexanediol, neopentyl glycol, cyclohexanedimethanol, glycerol, trimethylolpropane, butanetriol, trimethylolethane, pentaerythritol, ditrimethylolpropane, dipentaerythritol, sorbitol, mannitol and the corresponding alkoxylated, especially ethoxylated and propoxylated, alcohols.

The group (B.2.2) also includes, for example, alkoxylated phenolic compounds, for instance ethoxylated or propoxylated bisphenols.

These reactive diluents may also, for example, be epoxide (meth)acrylates or urethane (meth)acrylates.

Epoxide (meth)acrylates are, for example, those as obtainable by reaction, known to those skilled in the art, of epoxidized olefins or poly- or diglycidyl ethers, such as bisphenol A diglycidyl ether, with (meth)acrylic acid.

Urethane (meth)acrylates are in particular reaction products, likewise known to those skilled in the art, of hydroxyalkyl (meth)acrylates with poly- or diisocyanates.

Such epoxide (meth)acrylates or urethane (meth)acrylates should be regarded as "mixed forms" of the compounds listed under groups (B.2.1) and (B.2.2).

The reactive diluents are typically used in a proportion of 0.5 to 5% by weight based on the total weight of the composition used in step (ii).

The effects of the defoamers and deaerators (B.3), lubricants and leveling assistants (B.4), thermally curing or radiation-curing assistants (B.5), substrate wetting aids (B.6), wetting and dispersing aids (B.7), hydrophobizing agents (B.8), adhesion promoters (B.9) and assistants for improving the scratch resistance (B.10) listed under component B usually cannot be strictly delimited from one another. For instance, lubricants and leveling assistants often additionally act as defoamers and/or deaerators and/or as assistants for improving the scratch resistance. Radiation-curing assistants can in turn act as lubricants and leveling assistants and/or deaerators and/or also as substrate wetting aids. In the individual case, some of these assistants may also fulfill the function of an adhesion promoter (B.10). In accordance with the above statements, a certain additive may therefore be attributed to more than one of the groups (B.3) to (B.10) described below.

The defoamers of group (B.3) include silicon-free and silicon-containing polymers. The silicon-containing polymers are, for example, unmodified or modified polydialkylsiloxanes or branched copolymers, comb copolymers or block copolymers composed of polydialkylsiloxane and polyether units, the latter being obtainable from ethylene oxide or propylene oxide.

The deaerators of group (B.3) include, for example, organic polymers, for instance polyethers and polyacrylates, dialkylpolysiloxanes, especially dimethylpolysiloxanes, organically modified polysiloxanes, for instance arylalkyl-modified polysiloxanes, or else fluorosilicones. The action of defoamers is based essentially on preventing foam formation or destroying foam which has already formed. Deaerators act essentially in such a way that they promote the coalescence of fine gas or air bubbles to larger bubbles in the medium to be deaerated, for example the inventive mixtures, and hence accelerate the escape of the gas (or of the air). Since defoamers can often also be used as deaerators and vice versa, these additives have been combined together under group (B.4). Such assistants are, for example, obtainable commercially from Tego as TEGO® Foamex 800, TEGO® Foamex 805, TEGO® Foamex 810, TEGO® Foamex 815, TEGO® Foamex 825, TEGO® Foamex 835, TEGO® Foamex 840, TEGO® Foamex 842, TEGO® Foamex 1435, TEGO® Foamex 1488, TEGO® Foamex 1495, TEGO® Foamex 3062, TEGO® Foamex 7447, TEGO® Foamex 8020, Tego® Foamex N, TEGO® Foamex K 3, TEGO® Antifoam 2-18, TEGO® Antifoam 2-57, TEGO® Antifoam 2-80, TEGO® Antifoam 2-82, TEGO® Antifoam 2-89, TEGO® Antifoam 2-92, TEGO® Antifoam 14, TEGO® Antifoam 28, TEGO® Antifoam 81, TEGO® Antifoam D 90, TEGO® Antifoam 93, TEGO® Antifoam 200, TEGO® Antifoam 201, TEGO® Antifoam 202, TEGO® Antifoam 793, TEGO® Antifoam 1488, TEGO® Antifoam 3062, TEGOPREN® 5803, TEGOPREN® 5852, TEGOPREN® 5863, TEGOPREN® 7008, TEGO® Antifoam 1-60, TEGO® Antifoam 1-62, TEGO® Antifoam 1-85, TEGO® Antifoam 2-67, TEGO® Antifoam WM 20, TEGO® Antifoam 50, TEGO® Antifoam 105, TEGO® Antifoam 730, TEGO® Antifoam MR 1015, TEGO® Antifoam MR 1016, TEGO® Antifoam 1435, TEGO® Antifoam N, TEGO® Antifoam KS 6, TEGO® Antifoam KS 10, TEGO® Antifoam KS 53, TEGO® Antifoam KS 95, TEGO® Antifoam KS 100, TEGO® Antifoam KE 600, TEGO® Antifoam KS 911, TEGO® Antifoam MR 1000, TEGO® Antifoam KS 1100, Tego® Airex 900, Tego® Airex 910, Tego® Airex 931, Tego® Airex 935, Tego® Airex 960, Tego® Airex 970, Tego® Airex 980 and Tego® Airex 985, and from BYK as BYK®-011, BYK®-019, BYK®-020, BYK®-021, BYK®-022, BYK®-023, BYK®-024, BYK®-025, BYK®-027, BYK®-031, BYK®-032, BYK®-033, BYK®-034, BYK®-035, BYK®-036, BYK®-037, BYK®-045, BYK®-051, BYK®-052, BYK®-053, BYK®-055, BYK®-057, BYK®-065, BYK®-067, BYK®-070, BYK®-080, BYK®-088, BYK®-141 and BYK®-A 530.

The assistants of group (B.3) are typically used in a proportion of about 0.05 to 3.0% by weight, preferably of about 0.5 to 2.0% by weight, based on the total weight of the composition used in step (ii).

The group (B.4) of the lubricants and leveling agents typically includes silicon-free but also silicon-containing polymers, for example polyacrylates or modified low molecular weight polydialkylsiloxanes. The modification consists in replacing some of the alkyl groups with a wide variety of organic radicals. These organic radicals are, for example, polyethers, polyesters or else long-chain alkyl radicals, the former finding most frequent use.

The polyether radicals of the correspondingly modified polysiloxanes are typically formed by means of ethylene oxide and/or propylene oxide units. The higher the proportion of these alkylene oxide units is in the modified polysiloxane, the more hydrophilic is generally the resulting product.

Such assistants are obtainable commercially, for example, from Tego as TEGO® Glide 100, TEGO® Glide ZG 400, TEGO® Glide 406, TEGO® Glide 410, TEGO® Glide 411, TEGO® Glide 415, TEGO® Glide 420, TEGO® Glide 435, TEGO® Glide 440, TEGO® Glide 450, TEGO® Glide A 115, TEGO® Glide B 1484 (also usable as a defoamer and deaerator), TEGO® Flow ATF, TEGO® Flow ATF2, TEGO® Flow 300, TEGO® Flow 460, TEGO® Flow 425 and TEGO® Flow ZFS 460. The radiation-curable lubricants and leveling agents used, which additionally also serve to improve scratch resistance, can be the products TEGO® Rad 2100, TEGO® Rad 2200, TEGO® Rad 2300, TEGO® Rad 2500, TEGO® Rad 2600, TEGO® Rad 2700 and TEGO® Twin 4000 likewise obtainable from Tego. Such assistants are obtainable from BYK, for example as BYK®-300, BYK®-306, BYK®-307, BYK®-310, BYK®-320, BYK®-322, BYK®-331, BYK®-333, BYK®-337, BYK®-341, Byk® 354, Byk® 361 N, BYK®-378 and BYK®-388.

The assistants of group (B.4) are typically used in a proportion of about 0.05 to 3.0% by weight, preferably of about 0.5 to 2.0% by weight, based on the total weight of the composition used in step (ii).

Group (B.5) includes, as radiation-curing assistants, in particular polysiloxanes with terminal double bonds which are, for example, part of an acrylate group. Such assistants can be made to crosslink by actinic or, for example, electron beam radiation. These assistants generally combine several properties in one. In the uncrosslinked state, they can act as defoamers, deaerators, lubricants and leveling agents and/or substrate wetting aids; in the crosslinked state, they increase in particular the scratch resistance, for example of coatings or films which can be produced with the inventive mixtures. The improvement in the shine performance, for example, in the same coatings or films can essentially be regarded as the effect of the action of these assistants as defoamers, deaerators and/or lubricants and leveling agents (in the uncrosslinked state). The radiation-curing assistants which can be used are, for example, the products TEGO® Rad 2100, TEGO® Rad 2200, TEGO® Rad 2500, TEGO® Rad 2600 and TEGO® Rad 2700 obtainable from Tego, and the product BYK®-371 obtainable from BYK. Thermally curing assistants of group (B.5) comprise, for example, primary OH groups which can react with isocyanate groups, for example, of the binder.

The thermally curing assistants used can, for example, be the products BYK®-370, BYK®-373 and BYK®-375 obtainable from BYK. The assistants of group (B.6) are typically used in a proportion of from about 0.1 to 5.0% by weight, preferably from about 0.1 to 3.0% by weight, based on the total weight of the composition used in step (ii).

The assistants of group (B.6) of the substrate wetting aids serve in particular to increase the wettability of the substrate, which is to be coated, for instance, by coating compositions, for example the composition used in step (ii). The generally associated improvement in the lubricating and leveling performance of such printing inks or coating compositions has an effect on the appearance of the finished (for example crosslinked) print or of the finished (for example crosslinked) layer. A wide variety of such assistants are commercially available, for example, from Tego as TEGO® Wet KL 245, TEGO® Wet 250, TEGO® Wet 260 and TEGO® Wet ZFS 453, and from BYK as BYK®-306, BYK®-307, BYK®-310, BYK®-333, BYK®-344, BYK®-345, BYK®-346 and Byk®-348.

Other products with good suitability are those of the Zonyl® brand from Dupont, such as Zonyl® FSA and Zonyl® FSG. These are fluorinated surfactants/wetting agents.

The assistants of group (B.6) are typically used in a proportion of about 0.01 to 3.0% by weight, preferably of about 0.01 to 1.5% by weight and especially of 0.03 to 1.5% by weight, based on the total weight of the composition used in step (ii).

The assistants of group (B.7) of the wetting and dispersing aids serve in particular to prevent the leaching and floating and also the settling of pigments, and are therefore useful, if necessary, in pigmented compositions in particular.

These assistants stabilize pigment dispersions essentially by electrostatic repulsion and/or steric hindrance of the additized pigment particles, the interaction of the assistant with the surrounding medium (for example binder) playing a major role in the latter case. Since the use of such wetting and dispersing aids is common practice, for example, in the technical field of printing inks and paints, the selection of such a suitable assistant generally presents no difficulties to the person skilled in the art in the given case.

Such wetting and dispersing aids are supplied commercially, for example, by Tego as TEGO® Dispers 610, TEGO® Dispers 610 S, TEGO® Dispers 630, TEGO® Dispers 700, TEGO® Dispers 705, TEGO® Dispers 710, TEGO® Dispers 720 W, TEGO® Dispers 725 W, TEGO® Dispers 730 W, TEGO® Dispers 735 W and TEGO® Dispers 740 W, and by BYK as Disperbyk®, Disperbyk®-107, Disperbyk®-108, Disperbyk®-110, Disperbyk®-111, Disperbyk®-115, Disperbyk®-130, Disperbyk®-160, Disperbyk®-161, Disperbyk®-162, Disperbyk®-163, Disperbyk®-164, Disperbyk®-165, Disperbyk®-166, Disperbyk®-167, Disperbyk®-170, Disperbyk®-174, Disperbyk®-180, Disperbyk®-181, Disperbyk®-182, Disperbyk®-183, Disperbyk®-184, Disperbyk®-185, Disperbyk®-190, Anti-Terra®-U, Anti-Terra®-U 80, Anti-Terra®-P, Anti-Terra®-203, Anti-Terra®-204, Anti-Terra® 5 206, BYK®-151, BYK®-154, BYK®-155, BYK®-P 104 S, BYK®-P 105, Lactimon®, Lactimon®-WS and Bykumen®. The above-mentioned Zonyl® brands, such as Zonyl® FSA and Zonyl® FSG, from DuPont are also an option here.

The dosage of the assistants of group (B.7) depends mainly upon the surface area of the pigments to be covered and upon the mean molar mass of the assistant.

For inorganic pigments and low molecular weight assistants, a content of the latter of from about 0.5 to 2.0% by weight based on the total weight of pigment and assistant is typically assumed. In the case of high molecular weight assistants, the content is increased to from about 1.0 to 30% by weight.

In the case of organic pigments and low molecular weight assistants, the content of the latter is about 1.0 to 5.0% by weight based on the total weight of pigment and assistant. In the case of high molecular weight assistants, this content may be in the range from about 10.0 to 90% by weight. In every case, therefore, preliminary experiments are recommended, which can, though, be accomplished by the person skilled in the art in a simple manner.

The hydrophobizing agents of group (B.8) can be used with a view, for example, to providing prints or coatings obtained with inventive mixtures with water-repellent properties. This makes impossible, or at least greatly suppresses, swelling resulting from water absorption and hence a change, for example, in the optical properties of such prints or coatings. In addition, when the mixtures are used, for example, as a printing ink in offset printing, their absorption of water can be prevented or at least greatly inhibited. Such hydrophobizing agents are commercially available, for example, from Tego as Tego® Phobe WF, Tego® Phobe 1000, Tego® Phobe 1000 S, Tego® Phobe 1010, Tego® Phobe 1030, Tego® Phobe 1040, Tego® Phobe 1050, Tego® Phobe 1200, Tego® Phobe 1300, Tego® Phobe 1310 and Tego® Phobe 1400.

The assistants of group (B.8) are used typically in a proportion of about 0.05 to 5.0% by weight, preferably of about 0.1 to 3.0% by weight, based on the total weight of the composition used in step (ii).

Adhesion promoters of group (B.9) serve to improve the adhesion between two interfaces in contact. It immediately becomes evident from this that essentially only the proportion of the adhesion promoter which is present in one interface, the other interface or in both interfaces is effective. When the intention is to apply, for example, liquid or pasty printing inks, coatings or paints to a solid substrate, this generally means that either the adhesion promoter has to be added directly to the latter or the substrate has to be subjected to a pretreatment with the adhesion promoters (also known as priming), i.e. that changed chemical and/or physical surface properties are imparted to this substrate.

When the substrate has been primed beforehand with a background color, this means that the interfaces in contact are now that of the background color on the one hand and that of the printing ink or of the coating or paint on the other hand. Thus, in this case, not only the adhesion properties between substrate and background color, but also between background color and printing ink or coating or paint, play a role for the adhesion of the entire combination on the substrate. It is also possible for the substrate wetting aids already detailed under group (B.7) to be addressed as adhesion promoters in the wider sense, but these generally do not have the same capacity for adhesion promotion.

With regard to the wide variety of physical and chemical properties of substrates and of printing inks, coatings and paints intended, for example, for the printing or coating thereof the multitude of adhesion promoter systems is not surprising. Adhesion promoters based on silanes are, for example, 3-aminopropyltrimethoxysilane, 3-aminopropyltriethoxysilane, 3-aminopropylmethyldiethoxysilane, N-aminoethyl-3-aminopropyltrimethoxysilane, N-aminoethyl-3-aminopropylmethyldimethoxysilane, N-methyl-3-aminopropyltrimethoxysilane, 3-ureidopropyltriethoxysilane, 3-methacryloyloxypropyltrimethoxysilane, 3-glycidyloxypropyltrimethoxysilane, 3-mercaptopropyltrimethoxysilane, 3-chloropropyltrimethoxysilane or vinyltrimethoxysilane. These and further silanes are obtainable, for example, under the brand name DYNASILAN® from Hüls.

Adhesion promoters based on titanates/zirconates and titanium/zirconium bisacetylacetonates correspond, for example, to the following formulae

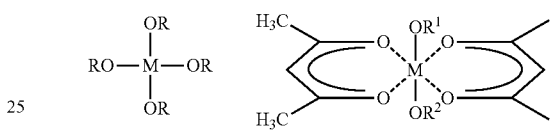

in which M is titanium or zirconium, and R, $R^1$ and $R^2$ are each $C_1$-$C_4$-alkyl, for example isopropyl or n-butyl. Examples of such compounds are, for instance, tetraisopropyl titanate, tetra-n-butyl titanate, titanium bis(acetylacetonate) diisopropoxide, titanium bis(acetylacetonate) dibutoxide, titanium bis(acetylacetonate) monobutoxide monoisopropoxide or titanium bis(acetylacetonate) monoethoxide monoisopropoxide.

Further titanium and zirconium compounds usable as adhesion promoters are n-butyl polytitanate, isopropyl triisostearoyltitanate, isopropyl tris(N-ethylaminoethylamino)-titanate and zirconium bis(diethylcitrate) diisopropoxide. These and further titanium and zirconium compounds are obtainable, for example, under the brand names TYZOR® (from DuPont), Ken-React® (from Kenrich Petrochemicals Inc.) and Tilcom® (from Tioxide Chemicals). The adhesion promoters used may also be zirconium aluminates, as obtainable, for example, under the brand name Manchem® (from Rhone Poulenc). Further examples of useful adhesion-promoting additives in printing inks or paints are chlorinated polyolefins (obtainable, for example, from Eastman Chemical and Toyo Kasei), polyesters (obtainable, for example, from Hüls AG, BASF SE, Gebr. Borchers AG, Pluess-Staufer AG, Hoechst AG and Worlee), compounds based on sucrose, for example sucrose benzoate or sucrose acetoisobutyrate (the latter obtainable, for example, from Eastman Chemical), phosphoric esters (obtainable, for example, from The Lubrizol Company and Hoechst AG) and polyethyleneimines (obtainable, for example, from BASF SE), and examples of useful adhesion-promoting additives in printing inks for flexographic printing, film printing and packaging printing are rosin esters (obtainable, for example from Robert Kraemer GmbH).

Typically, the substrate to be printed or to be coated, for example, will be pretreated appropriately, i.e. such additives will be used as primers. Appropriate technical information for this purpose can generally be learnt from the manufacturers of such additives, or the person skilled in the art can obtain this information in a simple manner by appropriate preliminary experiments.

Should these additives, however, be added as assistants of group (B.9) to the inventive mixtures, their content is typically about 0.05 to 5.0% by weight based on the total weight of the liquid-crystalline mixture. These concentration data serve merely as an indication, since amount and identity of the additive are determined in the individual case by the nature of the substrate and the printing/coating composition. Typically, appropriate technical information for this case is available from the manufacturers of such additives, or can be determined by the person skilled in the art by appropriate preliminary experiments in a simple manner.

The group (B.10) of the assistants for improving scratch resistance includes, for example, the products TEGO® Rad 2100, TEGO® Rad 2200, TEGO® Rad 2500, TEGO® Rad 2600 and TEGO® Rad 2700 which are obtainable from Tego and have already been mentioned above.

For these assistants, useful amounts are likewise those mentioned in group (B.5), i.e. these additives are typically used in a proportion of about 0.1 to 5.0% by weight, preferably about 0.1 to 3.0% by weight, based on the total weight of the composition used in step (ii).

The group (C.1) of the dyes includes, for example, dyes from the class of the azo dyes, metal complex dyes, basic dyes such as di- and triarylmethane dyes and salts thereof, azomethine derivatives, polymethines, antraquinone dyes and the like. An overview of suitable dyes which can be used in the inventive mixture is given by the book by H. Zollinger, "Color Chemistry", Wiley-VCH, Weinheim, 3$^{rd}$ edition 2003.

It is in particular also possible to add to the inventive mixtures photochromic, thermochromic or luminescent dyes, and dyes which have a combination of these properties. In addition to the typical fluorescent dyes, fluorescent dyes should also be understood to mean optical brighteners.

Examples of the latter include the class of the bisstyrylbenzenes, especially of the cyanostyryl compounds, and correspond to the formula

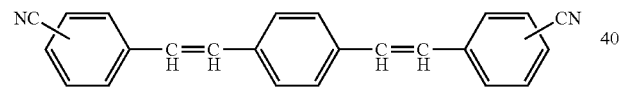

Further suitable optical brighteners from the class of the stilbenes have, for example, the formulae

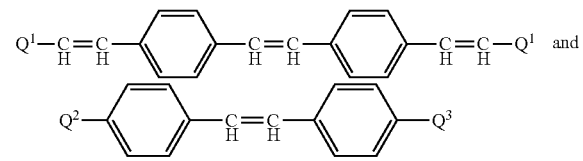

in which $Q^1$ is in each case $C_1$-$C_4$-alkoxycarbonyl or cyano, $Q^2$ is benzoxazol-2-yl, which may be mono- or disubstituted by $C_1$-$C_4$-alkyl, especially methyl, $Q^3$ is $C_1$-$C_4$-alkoxycarbonyl or 3-($C_1$-$C_4$-alkyl)-1,2,4-oxadiazol-3-yl.

Further suitable optical brighteners from the class of the benzoxazoles are, for example, those of the formulae

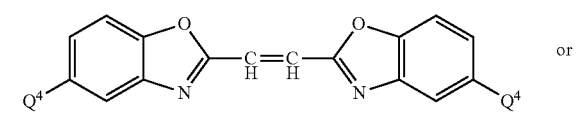

or

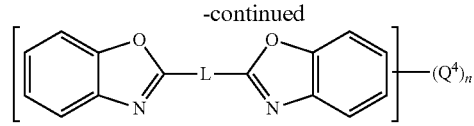

in which $Q^4$ is in each case $C_1$-$C_4$-alkyl, especially methyl, L is a radical of the formula

and n is an integer from 0 to 2.

Suitable optical brighteners from the class of the coumarins have, for example, the formula

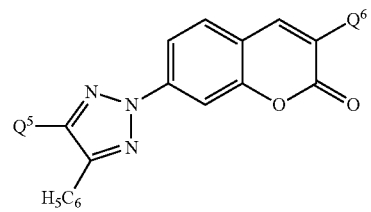

in which
$Q^5$ is $C_1$-$C_4$-alkyl and
$Q^6$ is phenyl or 3-halopyrazol-1-yl, especially 3-chloropyrazol-1-yl.

Further suitable optical brighteners from the class of the pyrenes correspond, for example, to the formula

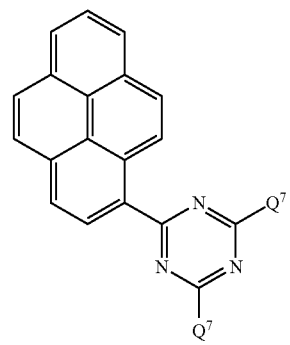

in which
$Q^7$ is in each case $C_1$-$C_4$-alkoxy, especially methoxy.

The abovementioned brighteners can be used either alone or in a mixture with one another.

The abovementioned optical brighteners are generally commercially available products known per se. They are described, for example, in Ullmann's Encyclopedia of Industrial Chemistry, 5$^{th}$ edition, volume A18, pages 156 to 161, or can be obtained by the methods described there.

In particular, if desired, one or more optical brighteners from the class of the bisstyrylbenzenes is used, especially of the cyanostyrylbenzenes. The latter may be used as individual compounds, but also as a mixture of the isomeric compounds.

In this case, the isomers correspond to the formulae

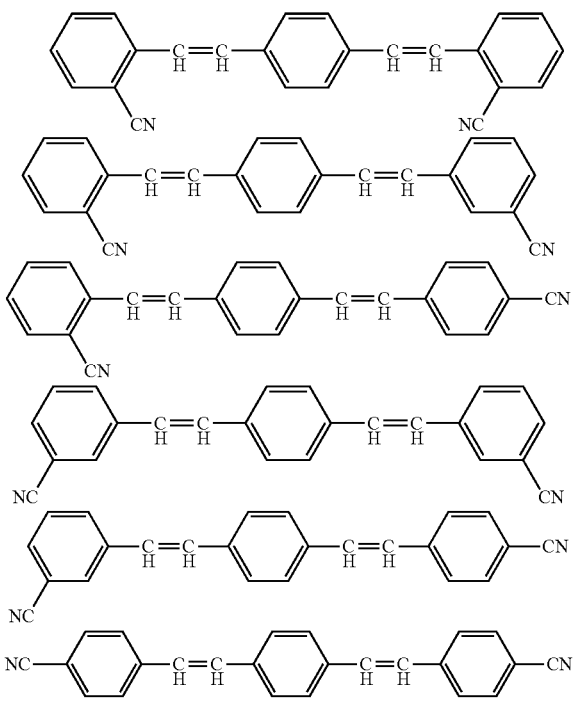

Optical brighteners are sold, for example, commercially as Ultraphor® SF 004, Ultraphor® SF MO, Ultraphor® SF MP and Ultraphor® SF PO by BASF SE.

The group (C.2) of the pigments includes both inorganic and organic pigments. An overview of inorganic color pigments which can be used in the inventive mixtures is given by the book by H. Endriβ "Aktuelle anorganische Bunt-Pigmente" ["Current Inorganic Color Pigments"] (editor U. Zorll, Curt-R.-Vincentz-Verlag Hanover 1997), and the book by G. Buxbaum, "Industrial Inorganic Pigments", Wiley-VCH, Weinheim, 3rd edition 2005. In addition, useful further pigments which are not listed in the aforementioned book are also Pigment Black 6 and Pigment Black 7 (carbon black), Pigment Black 11 (iron oxide black, $Fe_3O_4$), Pigment White 4 (zinc oxide, ZnO), Pigment White 5 (lithopone, ZnS/$BaSO_4$), Pigment White 6 (titanium oxide, $TiO_2$) and Pigment White 7 (zinc sulfide, ZnS).

An overview of organic pigments which can be added to the composition used in step (ii) is provided by the book by W. Herbst and K. Hunger "Industrielle organische Pigmente" ["Industrial Organic Pigments"], Wiley-VCH, Weinheim, 3rd edition 2004.

It is also possible to add to the composition used in step (ii) magnetic, electrically conductive, photochromic, thermochromic or luminescent pigments, and also pigments which have a combination of these properties.

In addition to some organic pigments, for example Pigment Yellow 101, useful pigments having luminescent properties are also inorganic, doped or undoped compounds essentially based on alkaline earth metal oxides, alkaline earth metal/transition metal oxides, alkaline earth metal/aluminum oxides, alkaline earth metal/silicon oxides or alkaline earth metal/phosphorus oxides, alkaline earth metal halides, Zn/silicon oxides, Zn/alkaline earth metal halides, rare earth metal oxides, rare earth metal/transition metal oxides, rare earth metal/aluminum oxides, rare earth metal/silicon oxides or rare earth metal/phosphorus oxides, rare earth metal oxide sulfides or oxide halides, zinc oxide, sulfide or selenide, cadmium oxide, sulfide or selenide or zinc/cadmium oxide, sulfide or selenide, the cadmium compounds being of lower importance owing to their toxicological and ecological relevance.

The dopants used in these compounds are usually aluminum, tin, antimony, rare earth metals, such as cerium, europium or terbium, transition metals, such as manganese, copper, silver or zinc, or combinations of these elements.

Luminescent pigments are specified below by way of example, the notation "compound:element(s)" being taken to mean to the relevant person skilled in the art that said compound has been doped with the corresponding element(s). In addition, for example, the notation "(P,V)", denotes that the corresponding lattice positions in the solid structure of the pigment are randomly occupied by phosphorus and vanadium.

Examples of such compounds which are capable of luminescence are $MgWO_4$, $CaWO_4$, $Sr_4Al_{14}O_{25}$:Eu, $BaMg_2Al_{10}O_{27}$:Eu, $MgAl_{11}O_{19}$:Ce,Tb, $MgSiO_3$:Mn, $Ca_{10}(PO_4)_6(F,Cl)$:Sb,Mn, $(SrMg)_2P_2O_7$:Eu, $SrMg_2P_2O_7$:Sn, BaFCl:Eu, $Zn_2SiO_4$:Mn, $(Zn,Mg)F_2$:Mn, $Y_2O_3$:Eu, $YVO_4$:Eu, $Y(P,V)O_4$:Eu, $Y_2SiO_5$:Ce,Tb, $Y_2O_2S$:Eu, $Y_2O_2S$:Tb, $La_2O_2S$:Tb, $Gd_2O_2S$:Tb, LaOBr:Tb, ZnO:Zn, ZnS:Mn, ZnS:Ag, ZnS/CdS:Ag, ZnS:Cu,Al, ZnSe:Mn, ZnSe:Ag and ZnSe:Cu.

If the inventive film is to be essentially transparent, the components of group C are used in maximum amounts such that the film transmits at least 80% of the incident radiation having a wavelength of 350 to 750 nm. Component C imparts, if desired, a tint to the film. In order to ensure maximum transparency, the compounds of component C used are preferably those having a particle size of not more than 100 nm, preferably of not more than 50 nm.

Examples of light, heat and/or oxidation stabilizers as component D include: alkylated monophenols, such as 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which have a linear or branched side chain, for example 2,6-dinonyl-4-methylphenol, 2,4-dimethyl-6-(1'-methylundec-1-yl)-phenol, 2,4-dimethyl-6-(1'-methylheptadec-1'-yl)phenol, 2,4-dimethyl-6-(1'-methyltridec-1'-yl)phenol and mixtures of these compounds, alkylthiomethylphenols, such as 2,4-dioctylthiomethyl-6-tert-butylphenol, 2,4-dioctyl-thiomethyl-6-methylphenol, 2,4-dioctylthiomethyl-6-ethylphenol and 2,6-di-dodecylthio-methyl-4-nonylphenol, hydroquinones and alkylated hydroquinones, such as 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate and bis(3,5-di-tert-butyl-4-hydroxyphenyl)adipate, tocopherols, such as α-tocopherol, β-tocopherol, γ-tocopherol, δ-tocopherol and mixtures of these compounds, and tocopherol derivatives, such as tocopheryl acetate, succinate, nicotinate and polyoxyethylenesuccinate ("tocofersolate"), hydroxylated diphenyl thioethers, such as 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol) and 4,4'-bis(2,6-dimethyl-4-hydroxyphenyl) disulfide, alkylidenebisphenols, such as 2,2'-methylenebis(6-tert-butyl-4-methylphenol), 2,2'-methylenebis(6-tert-butyl-4-ethylphenol), 2,2'-methylenebis[4-methyl-6-(α-methyl-cyclohexyl)phenol], 2,2'-methylenebis(4-methyl-6-cyclohexylphenol), 2,2'-methylene-bis(6-nonyl-4-methylphenol), 2,2'-methylenebis(4,6-di-tert-butylphenol), 2,2-ethylidene-bis(4,6-di-tert-butylphenol), 2,2'-ethylidenebis(6-tert-butyl-4-isobutylphenol), 2,2'-methylenebis [6-(α-methylbenzyl)-4-nonylphenol], 2,2'-methylenebis[6-(α,α-di-methylbenzyl)-4-nonylphenol], 4,4'-methylenebis (2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl) butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecyl-mercaptobutane and 1,1,5,5-tetrakis(5-tert-butyl-4-hydroxy-2-methylphenyl)pentane, O-, N- and S-benzyl compounds, such as 3,5,3',5'-tetra-tert-butyl-4,4'-dihydroxydibenzyl ether, octadecyl 4-hydroxy-3,5-dimethylbenzylmercaptoacetate, tridecyl 4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl) sulfide and isooctyl 3,5-di-tert-butyl-4-hydroxybenzylmercapto-acetate, aromatic hydroxybenzyl compounds, such as 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene and 2,4,6-tris(3,5-di-tert-butyl-4-hydroxybenzyl)phenol, triazine compounds, such as 2,4-bis(octylmercapto)-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris-(3,5-di-tert-butyl-4-hydroxyphenylpropionyl) hexahydro-1,3,5-triazine, 1,3,5-tris(3,5-dicyclohexyl-4-hydroxybenzyl) isocyanurate and 1,3,5-tris(2-hydroxyethyl) isocyanurate, benzylphosphonates, such as dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate and dioctadecyl 5-tert-butyl-4-hydroxy-3-methylbenzyl-phosphonate, acylaminophenols, such as 4-hydroxylauroylanilide, 4-hydroxystearoylanilide and octyl N-(3,5-di-tert-butyl-4-hydroxyphenyl)carbamate, propionic and acetic esters, for example of monohydric or polyhydric alcohols, such as methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane and 4-hydroxymethyl-1-phospha-2,6,7-trioxabicyclo[2.2.2]octane, propionamides based on amine derivatives, such as N,N'-bis(3,5-di-tert-butyl-4-hydroxyphenylpropionyl) hexamethylenediamine, N,N'-bis(3,5-di-tert-butyl-4-hydroxy-phenylpropionyl)trimethylenediamine and N,N'-bis (3,5-di-tert-butyl-4-hydroxyphenyl-propionyl)hydrazine, ascorbic acid (Vitamin C) and ascorbic acid derivatives, such as ascorbyl palmitate, laurate and stearate, and ascorbyl sulfate and phosphate, antioxidants based on amine compounds, such as N,N'-diisopropyl-p-phenylene-diamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octyl-substituted diphenylamine, such as p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis[4-methoxyphenyl)amine, 2,6-di-tert-butyl-4-dimethylaminomethylphenol, 2,4-diaminodiphenylmethane, 4,4'-diaminodiphenylmethane, N,N,N', N'-tetramethyl-4,4'-diaminodiphenylmethane, 1,2-bis[(2-methylphenyl)amino]ethane, 1,2-bis(phenyl-amino) propane, (o-tolyl)biguanide, bis[4-(1',3'-dimethylbutyl) phenyl]amine, tert-octyl-substituted N-phenyl-1-naphthylamine, a mixture of mono- and dialkylated tert-butyl/tert-octyldiphenylamine, a mixture of mono- and dialkylated nonyldiphenylamine, a mixture of mono- and dialkylated dodecyldiphenylamine, a mixture of mono- and dialkylated isopropyl/isohexyldiphenylamine, a mixture of mono- and dialkylated tert-butyldiphenylamine, 2,3-dihydro-3,3-dimethyl-4H-1,4-benzothiazine, phenothiazine, a mixture of mono- and dialkylated tert-butyl/tert-octylphenothiazine, a mixture of mono- and dialkylated tert-octylphenothiazine, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6, 6-tetramethylpiperidin-4-yl) sebacate, 2,2,6,6-tetramethylpiperidin-4-one and 2,2,6,6-tetramethylpiperidin-4-ol, phosphites and phosphonites, such as triphenylphosphite, diphenyl alkyl phosphite, phenyl dialkyl phosphite, tris(nonylphenyl) phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl))pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenzo[d,g]-1,3,2-dioxa-phosphocine, 6-fluoro-2,4,8,10-tetra-tert-butyl-12-methyldibenzo[d,g]-1,3,2-dioxa-phosphocine, bis(2,4-di-tert-butyl-6-methylphenyl)methyl phosphite and bis(2,4-di-tert-butyl-6-methylphenyl)ethyl phosphite, 2-(2'-hydroxyphenyl)benzotriazoles, such as 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxy-phenyl)benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)-benzotriazole, a mixture of 2-(3'-tert-butyl-2'-hydroxy-5'-(2-octyloxy-carbonylethyl)-phenyl)-5-chlorobenzotriazole, 2-(3'-tert-butyl-5'-[2-(2-ethylhexyloxy)-carbonylethyl]-2'-hydroxyphenyl)-5-chlorobenzotriazole, 2-(3'-tert-butyl-2'-hydroxy-5'-(2-methoxy-carbonylethyl)phenyl)-5-chlorobenzotriazole, 2-(3'-tert-butyl-2'-hydroxy-5'-(2-methoxy-carbonylethyl)phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)-carbonylethyl]-2'-hydroxyphenyl)benzotriazole, 2-(3'-dodecyl-2'-hydroxy-5'-methylphenyl)benzotriazole and 2-(3'-tert-butyl-2'-hydroxy-5'-(2-isooctyloxycarbonyl-ethyl)phenylbenzotriazole, 2,2'-methylenebis[4-(1,1,3,3-tetramethylbutyl)-6-benzotriazol-2-ylphenol]; the product of complete esterification of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$]$_2$, where R=3'-tert-butyl-4'-hydroxy-5'-2H-benzotriazol-2-ylphenyl], sulfur-containing peroxide scavengers and sulfur-containing antioxidants, such as esters of 3,3'-thiodipropionic acid, for example the lauryl, stearyl, myristyl and tridecyl esters, mercaptobenzimidazole and the zinc salt of 2-mercaptobenzimidazole, dibutylzinc dithiocarbamate, dioctadecyl disulfide and pentaerythritol tetrakis(β-dodecyl-mercapto)propionate, 2-hydroxybenzophenones, such as the 4-hydroxy, 4-methoxy, 4-octyloxy, 4-decycloxy, 4-dodecyloxy, 4-benzyloxy, 4,2',4'-trihydroxy and 2'-hydroxy-4,4'-dimethoxy derivatives, esters of unsubstituted and substituted benzoic acids, such as 4-tert-butylphenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate and 2-methyl-4,6-di-tert-butylphenyl 3,5-di-tert-butyl-4-hydroxybenzoate, acrylates, such as ethyl α-cyano-β,β-diphenylacrylate, isooctyl α-cyano-β,β-diphenylacrylate, methyl α-methoxycarbonylcinnamate, methyl α-cyano-β-methyl-p-methoxycinnamate, butyl α-cyano-β-methyl-p-methoxycinnamate and methyl α-methoxy-carbonyl-p-methoxycinnamate, sterically hindered amines, such as bis(2,2,6,6-tetramethylpiperidin-4-yl) sebacate, bis(2,2,6,6-tetramethylpiperidin-4-yl) succinate, bis(1,2,2,6,6-pentamethylpiperidin-4-yl) sebacate, bis(1-octyloxy-2,2,6,6-tetramethylpiperidin-4-yl) sebacate, bis(1,2,2,6,6-pentamethylpiperidin-4-yl)-n-butyl 3,5-di-tert-butyl-4-hydroxybenzylmalonate, the condensation product of 1-(2-hydroxyethyl)-2,2,6,6-tetramethyl-4-hydroxypiperidine and succinic acid, the condensation product of N,N'-bis(2,2,6,5-tetramethylpiperidin-4-yl) hexamethylenediamine and 4-tert-octylamino-2,6-dichloro-1,3,5-triazine, tris(2,2,6,6-tetramethylpiperidin-4-yl) nitrilotriacetate, tetrakis(2,2,6,6-tetramethylpiperidin-4-yl) 1,2,3,4-butanetetracarboxylate, 1,1'-(1,2-ethylene)bis(3,3,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidin-4-yl) 2-n-butyl-2-(2-hydroxy-3,5-di-tert-butyl-benzyl)malonate, 3-n-octyl-7,7,9,9-tetramethyl-1,3,8-triazaspiro[4.5]decane-2,4-dione, bis(1-octyloxy-2,2,6,6-tetramethylpiperidin-4-yl) sebacate, bis(1-octyloxy-2,2,6,5-tetramethylpiperidin-4-yl) succinate, the condensation product of N,N'-bis(2,2,6,6-tetramethylpiperidin-4-yl)hexamethylenediamine and 4-morpholino-2,6-dichloro-1,3,5-triazine, the condensation product of 2-chloro-4,6-bis(4-n-butylamino-2,2,6,6-tetramethylpiperidin-4-yl)-1,3,5-triazine and 1,2-bis(3-aminopropylamino) ethane, the condensation product of 2-chloro-4,6-di(4-n-butylamino-1,2,2,6,6-pentamethylpiperidin-4-yl)-1,3,5-triazine and 1,2-bis(3-aminopropylamino)ethane, 8-acetyl-3-dodecyl-7,7,9,9-tetramethyl-1,3,8-triazaspiro-[4.5]decane-2,4-dione, 3-dodecyl-1-(2,2,6,6-tetramethylpiperidin-4-yl) pyrrolidine-2,5-dione, 3-dodecyl-1-(1,2,2,6,6-pentamethylpiperidin-4-yl)-pyrrolidine-2,5-dione, a mixture of 4-hexadecyloxy- and 4-stearyloxy-2,2,6,6-tetramethylpiperidine, the condensation product of N,N'-bis(2,2,6,6-tetramethylpiperidin-4-yl)hexamethylenediamine and 4-cyclohexylamino-2,6-dichloro-1,3,5-triazine, the condensation product of 1,2-bis(3-aminopropylamino)ethane and 2,4,6-trichloro-1,3,5-triazine, 4-butylamino-2,2,6,6-tetramethylpiperidine, N-(2,2,6,6-tetramethylpiperidin-4-yl)-n-dodecyl-succinimide, N-(1,2,2,6,6-pentamethylpiperidin-4-yl)-n-dodecylsuccinimide, 2-undecyl-7,7,9,9-tetramethyl-1-oxa-3,8-diaza-4-oxo-spiro[4.5]decane, the condensation product of 7,7,9,9-tetramethyl-2-cycloundecyl-1-oxa-3,8-diaza-4-oxo-spiro-[4.5]decane and epichlorohydrin, the condensation products of 4-amino-2,2,6,6-tetramethylpiperidine with tetramethylolacetylenediureas and poly(methoxypropyl-3-oxy)-[4(2,2,6,6-tetramethyl)piperidinyl]siloxane, oxamides, such as 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyl-oxanilide, N,N'-bis(3-dimethylaminopropyl)oxalamide, 2-ethoxy-5-tert-butyl-2'-ethoxanilide and its mixture with 2-ethoxy-2'-ethyl-5,4'-di-tert-butoxanilide, and mixtures of ortho-, para-methoxy-disubstituted oxanilides and mixtures of ortho- and para-ethoxy-disubstituted oxanilides, and 2-(2-hydroxyphenyl)-1,3,5-triazines, such as 2,4,6-tris-(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methyl-5-phenyl)-1,3,5-triazine, 2-(2-hydroxy-4-dodecyl-oxyphenyl)-4,6-bis(2,4-dimethylphenyl)-1,3,5-triazine, 2-(2-hydroxy-4-tridecyloxy-phenyl)-4,6-bis(2,4-dimethylphenyl)-1,3,5-triazine, 2-[2-hydroxy-4-(2-hydroxy-3-butyl-oxypropoxy)phenyl]-4,6-bis(2,4-dimethyl)-1,3,5-triazine, 2-[2-hydroxy-4-(2-hydroxy-3-octyloxypropoxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)-phenyl]-4,6-bis-(2,4-dimethylphenyl)-1,3,5-triazine, 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine and 2-(2-hydroxyphenyl)-4-(4-methoxyphenyl)-6-phenyl-1,3,5-triazine.

As component E, the IR absorber, the compounds used are those which exhibit one or more absorption bands in the infrared spectral region, i.e. from >750 nm, e.g. from 751 nm, to 1 mm. Preference is given to using compounds which exhibit one absorption band in the near infrared (NIR) spectral region, i.e. from >750 (e.g. 751) to 2000 nm, and optionally additionally also in the visible spectral region, especially from 550 to 750 nm. When the compounds absorb both in the IR and in the visible spectral region, they preferably exhibit the greatest absorption maximum in the IR region and a smaller maximum (frequently in the form of a so-called absorption shoulder) in the visible region. In a particular embodiment, the compounds of component E additionally also exhibit fluorescence. Fluorescence is the transition of a system excited by absorption of electromagnetic radiation (usually visible light, UV radiation, X-rays or electron beams) to a state of lower energy by spontaneous emission of radiation of the same wavelength (resonance fluorescence) or longer wavelength. Preferred compounds of component E exhibit, when they fluoresce, a fluorescence in the IR spectral region, preferably in the NIR.

Such compounds are, for example, selected from naphthalenes, anthracenes, phenanthrenes, tetracenes, perylenes, terrylenes, quaterrylenes, pentarylenes, hexarylenes, anthraquinones, indanthrones, acridines, carbazoles, dibenzofurans, dinaphthofurans, benzimidazoles, benzothiazoles, phenazines, dioxazines, quinacridones, metal phthalocyanines, metal naphthalocyanines, metal porphyrins, coumarins, dibenzofuranones, dinaphthofuranones, benzimidazolones, indigo compounds, thioindigo compounds, quinophthalones, naphthoquinophthalones, diketopyrrolopyrroles and nickel dithiolates. Particularly preferred compounds of component E which absorb IR radiation and optionally fluoresce are selected from naphthalenes, anthracenes, phenanthrenes, tetracenes, perylenes, terrylenes, quaterrylenes, pentarylenes and hexarylenes, more preferably from perylenes, terrylenes and quaterrylenes and especially from terrylenes and quaterrylenes. The compound is especially a quaterrylene. Suitable compounds are described in WO 2008/012292, which is hereby fully incorporated by reference.

The composition used in step (ii) preferably comprises at least one photoinitiator. In this case, the photoinitiator is present in an amount of preferably at most 5% by weight, for example 0.05 to 5% by weight or preferably 0.1 to 5% by weight or especially 0.2 to 5% by weight, more preferably of at most 4% by weight, for example 0.05 to 4% by weight or preferably 0.1 to 4% by weight or especially 0.2 to 4% by weight, and especially of at most 3% by weight, for example 0.05 to 3% by weight or preferably 0.1 to 3% by weight or especially 0.2 to 3% by weight, based on the total weight of the composition. Especially when the hardening is performed under an inert gas atmosphere, it is possible to use significantly smaller amounts of photoinitiators. In this case, the photoinitiators are used in a proportion of preferably 0.01 to 1.0% by weight, more preferably 0.05 to 0.6% by weight, even more preferably 0.1 to 0.6% by weight and especially 0.2 to 0.6% by weight, based on the total weight of the composition.

However, it is also possible to perform the process according to the invention without the use of photoinitiators.

With regard to photoinitiators suitable in principle, reference is made to the above remarks. Preference is given, however, to using Irgacure® 907 or Irgacure® 127 (Ciba) or mixtures thereof as photoinitiators; these are compounds of the following formulae A (Irgacure® 907) and B (Irgacure® 127):

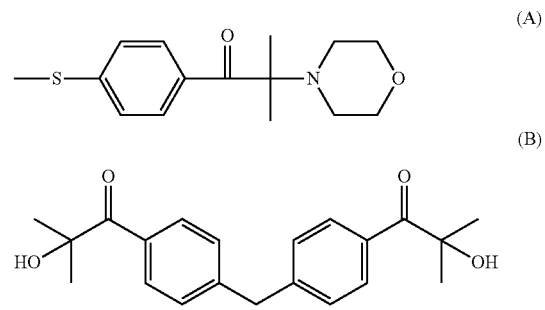

The composition used in step (ii) preferably comprises at least one dispersant. The dispersant is preferably an organic solvent. Suitable solvents are, for example, aliphatic hydrocarbons such as pentane, hexane, heptane, octane or petroleum ether, cycloaliphatic hydrocarbons such as cyclopentane, cyclohexane and cyclooctane, aromatic hydrocarbons such as benzene, toluene, the xylenes, chlorobenzene, dichlorobenzenes or nitrobenzene, heterocycles such as pyridine or N-methyl-pyrrolidine, haloalkanes such as methylene chloride, chloroform, carbon tetrachloride, chloroethane, dichloroethane, trichloroethane or tetrachloroethane, open-chain and cyclic ethers such as dimethyl ether, diethyl ether, dipropyl ether, methyl tert-butyl ether, methyl isobutyl ether, tetrahydrofuran or 1,4-dioxane, open-chain and cyclic ketones such as acetone, ethyl methyl ketone, cyclopentanone or cyclohexanone, $C_1$-$C_4$-alkanols such as methanol, ethanol, propanol, isopropanol, n-butanol, sec-butanol, isobutanol or tert-butanol, glycols such as ethylene glycol, glycol ethers such as diethylene glycol ethers or triethylene glycol ethers, esters of $C_1$-$C_4$-carboxylic acids with $C_1$-$C_4$-alkanols, such as ethyl acetate, propyl acetate, ethyl propionate or propyl propionate, amides of $C_1$-$C_4$-carboxylic acids, such as N,N-dimethylformamide, N,N-diethylformamide or N,N-dimethylacetamide, aliphatic and aromatic nitriles such as acetonitrile, propionitrile or benzonitrile, and sulfoxides such as dimethyl sulfoxide, and also mixtures of the aforementioned solvents. Among these, preference is given to the aromatic hydrocarbons mentioned (especially toluene) and the ketones mentioned (especially cyclopentanone) and the mixtures thereof.

The dispersant is present in the composition used in step (ii) in an amount of preferably 10 to 90% by weight, more preferably of 50 to 85% by weight and especially of 65 to 80% by weight, based on the total weight of the composition.

The composition used in step (ii) comprises preferably at least one leveling agent. With regard to suitable leveling agents and the concentration thereof in the composition, reference is made to the above remarks.

The composition used in step (ii) comprises, in a specific embodiment, at least one dye or at least one IR absorber. Preferred dyes or IR absorbers are selected from naphthalenes, anthracenes, phenanthrenes, tetracenes, perylenes, terrylenes, quaterrylenes, pentarylenes, hexarylenes, anthraquinones, indanthrones, acridines, carbazoles, dibenzofurans, dinaphthofurans, benzimidazoles, benzothiazoles, phenazines, dioxazines, quinacridones, metal phthalocyanines, metal naphthalocyanines, metal porphyrins, coumarins, dibenzofuranones, dinaphthofuranones, benzimidazolones, indigo compounds, thioindigo compounds, quinophthalones, naphthoquinophthalones, diketopyrrolopyrroles and nickel dithiolates. Such compounds are described, for example, in WO 2008/012292.

The composition is applied in step (ii) in such a way that the layer thickness of the polymer film which is formed from the composition applied in step (ii) after performance of step (v) (i.e. after the removal of the dispersant and the polymerization of the compounds present in the composition, but before the thermal aftertreatment) is preferably 0.1 to 10 µm, more preferably 0.5 to 5 µm, even more preferably 0.7 to 3.5 µm, even more especially preferably 0.9 to 3.5 µm and especially 1 to 2 µm.

This is brought about by the selection of the suitable process for applying the composition as a function of the solids content in the composition used in step (ii).

The composition can be applied to the carrier film or the substrate by means of customary processes, for example by means of processes selected from airblade coating, knife coating, airknife coating, squeegee coating, impregnation coating, reverse roll coating, transfer roll coating, gravure coating, kiss coating, flow coating, spray coating, spin coating, or printing processes such as relief printing, gravure printing, intaglio printing, flexographic printing, offset printing, inkjet printing, letterpress printing, pad printing, heatseal printing or screenprinting processes.

Preference is given to applying the composition by knife coating, and especially with a spiral doctor blade (for example from Erichsen). The higher the solids content of the composition used in step (ii), the lower the doctor blade size selected. For example, to achieve a dry layer thickness of about 1.5 µm (+/−0.3 µm) given a solids content of 24% by weight, preference is given to selecting a 15 µm doctor blade, and given a solids concentration of 30 to 33% by weight, in contrast, preference is given to using a 10 µm doctor blade.

If this has not already been accomplished by the process of application in step (ii), the composition applied in step (ii) has to be aligned before the polymerization step. The alignment of the liquid-crystalline layer generally proceeds spontaneously during the applying operation; it can, however, also be effected in a downstream step. In this case, the alignment is effected by means of the known methods, for example the interaction of the liquid-crystal phase with alignment layers, the application of electrical or magnetic fields and the mechanical knife coating of the liquid-crystal layers. However, the alignment preferably proceeds spontaneously under the action of the shear forces which act in the course of application.

When the alignment is not already accomplished in the process of application, it is possible to align only part of the liquid-crystalline layer. This affords films or substrates in which only this aligned part is recognizable as having line or fingerprint texture under the microscope or other imaging processes; the rest of the surface appears diffuse. In this way, it is possible to individually implement laminated markings.

The at least partial removal of the dispersion medium optionally present in step (iv) is effected preferably at elevated temperature, i.e. by heating, optionally under reduced pressure. The temperature employed preferably corresponds approximately (+/−20° C.) to that employed in step (vi).

The substrates provided in step (i) may assume any desired forms and consist of any desired materials. However, they are preferably flat structures, for example polymer films, glass, paper or cardboard, more preferably polymer films or glass, and especially polymer films.

The material from which the polymer films are formed is subject essentially to no restrictions. Suitable materials from which the polymer films are formed comprise, for example, polyethylene terephthalate, polyethylene naphthalate, polyvinyl butyral, polyvinyl chloride, flexible polyvinyl chloride, polymethyl methacrylate, poly(ethylene-co-vinyl acetate), polycarbonate, cellulose triacetate, polyether sulfone, polyester, polyamide, polyolefins and acrylic resins. Among these, preference is given to polyethylene terephthalate, polyvinyl butyral, polyvinyl chloride, cellulose triacetate, flexible polyvinyl chloride and polymethyl methacrylate.

The film has preferably been biaxially oriented.

When the film material or the substrate in general does not define a preferential direction for the alignment of the composition applied in step (ii), for example because it is itself isotropic, it has to be pretreated before step (ii) such that it defines an alignment, for example by rubbing or by application of an alignment layer (for further details see below). This is especially true of the use of glass and of cellulose triacetate.

It is also possible only to correspondingly pretreat part of the substrate or of the carrier film. This affords films or substrates in which only the aligned part is recognizable as having line or fingerprint texture under the microscope or in another imaging process; the rest of the surface appears diffuse. In this way, it is possible to individually implement laminated markings.

The carrier film provided in step (i) is preferably a polymer film, preferably a polymer film as described above.

The distinction between the film as the substrate and the carrier film is made because the carrier film, when a self-supporting film is the result of the process according to the invention, can be removed, such that the carrier film is not an obligatory constituent of the process product, but possibly serves merely as an aid. The film as the substrate, in contrast, remains part of the inventive product obtained. The "carrier" component in the term "carrier film" means that the carrier film is not only self-supporting but can also support the other layers without tearing.

The carrier film used in step (i) or the substrate used may be coated. The coating may comprise layers which improve the adhesion or alignment of the composition applied in step (ii) or impart particular properties to the end product, for example a color, a color flop, an absorption or reflection in a certain wavelength range and the like. For example, the coating may comprise alignment layers, nematic or cholesteric layers without line or fingerprint texture, or λ/2 films. Further details are evident from the description which follows, the application of the further layers being performed before step (ii) in the case of use of coated films or substrates in step (i).

The product obtainable by the process according to the invention may, in addition to the layer resulting from steps (ii) to (vi), also comprise further layers, for example at least one nematic or cholesteric layer without line or fingerprint texture, at least one alignment layer, at least one λ/2 film, at least one protective layer or at least one release layer.

When the inventive product (i.e. the inventive polymerized film or the inventive substrate), in addition to the layer which is obtained by steps (ii) to (vi), also comprises a further layer, the layer which is obtained by steps (ii) to (vi) may be directly adjacent to the carrier film provided in step (i) or the substrate provided in step (i), be enveloped by two or more of the additional layers, or form the outermost layer. The layer which is obtained by steps (ii) to (vi) preferably forms the outermost layer, i.e. the layer which, of all layers present, is furthest removed from the carrier film or the substrate, since this shows the line texture or fingerprint texture to its best advantage. Optionally, however, this outer layer may also be provided with a protective layer in order to very substantially prevent mechanical, thermal, chemical or other damage to this layer, for example as a result of scratching.

The nematic or cholesteric layer without line or fingerprint texture comprises customary polymeric films as obtained by polymerizing polymerizable achiral nematic compounds, optionally in combination with at least one polymerizable chiral compound, or by polymerizing cholesteric compounds. Suitable nematic compounds correspond to those mentioned above in the description of step (ii), though the restriction that at least one nematic compound must be polymerizable under the action of UV light does not apply here. Suitable polymerizable chiral compounds correspond to those mentioned above in the description of step (ii). According to the selection of the weight ratio between nematic and chiral compounds, after the polymerization, a layer which reflects wavelengths in the spectral region of the UV, of visible light and/or of the IR is obtained. Preference is given to selecting the weight ratio such that the layer formed possesses at least one reflection maximum in the spectral region of visible light (i.e. between 250 and 750 nm).

Such layers are produced by customary processes, i.e. by applying a composition which comprises at least one achiral nematic polymerizable compound and optionally at least one chiral polymerizable compound or at least one cholesteric compound, optionally aligning if this has not already been accomplished by the applying operation, and polymerizing the composition applied. The polymerization can be induced thermally, by UV light or by electron beams. In contrast to the production of layers with line or fingerprint texture, no thermal aftertreatment step takes place here.

The inventive product may also comprise at least one alignment layer. In this case, the at least one alignment layer is preferably arranged between the carrier film or the substrate and a liquid-crystalline layer and/or between at least two liquid-crystalline layers.

Alignment layers serve to improve the homogeneously planar alignment of the liquid-crystalline layer such that the liquid-crystalline layer is present as far as possible as a monodomain. This is because multidomains lead to light scattering in all spatial directions and give the layer a cloudy appearance.

Alignment layers are typically formed from polymer films which, before the application of the cholesteric layer, are mechanically rubbed unidirectionally such that the directors of the liquid-crystalline molecules align in the direction of rubbing.

Suitable polymers are, for example, polyimides and polyvinyl alcohol. Also suitable are photoalignment materials (LPP=linearly photopolymerizable polymer), for example from Rolic or Chisso. Also suitable are inorganic alignment layers, such as silicon dioxide, which are applied by cathode atomization or biased vapor deposition.

However, the alignment layers are preferably selected from polyimides, for example of the Sunever® brand from Nissan or from JSR, or polyvinyl alcohol, greater preference being given to polyimides. Polyimides are typically applied in the form of the corresponding polyamide acid and then hardened thermally, for example, to give the polyimide.

Suitable protective layers (topcoats) which are applied to a liquid-crystalline layer are, for example, those based on polyurethane, polyesterurethane, polyester acrylate or nitrocellulose coating material. The protective layer is preferably photochemically crosslinkable when the cholesteric layer is hardened photochemically. In this case, the cholesteric layer is more preferably not polymerized fully, such that the subsequent crosslinking of the protective layer crosslinks a portion of the cholesteric layer to the protective layer. The topcoat preferably has a layer thickness of at least 5 µm, more preferably of at least 10 µm. The topcoat preferably comprises a light-stabilizing active ingredient (see component E above). Suitable protective layers are obtained, for example, with the Laromer® brands from BASF SE. Preferred protective layers are those to counteract scratching. Also preferred are UV-protective layers.

Suitable adhesive layers are produced, for example, through the use of the above-described adhesion promoters. The adhesive layer preferably constitutes one of the outermost layers of the inventive product. When the inventive film comprises an adhesive layer, it is preferably also provided with a release layer in order to prevent undesired adhesion of the film, and thus constitutes one of the second-from-outermost layers of the inventive product.

The inventive product which, in addition to the layer obtained in steps (ii) to (vii), also comprises further layers is obtainable by a process comprising the following steps:

(i.1) providing a carrier film or a substrate and optionally cleaning the carrier film or the substrate and/or generating a preferential direction on the film or substrate surface or on part of the film or substrate surface;

(i.2) optionally: applying an alignment layer to the carrier film or the substrate or to part of the carrier film or of the substrate and optionally cleaning and/or generating a preferential direction on the alignment layer or on part of the alignment layer;

(i.3) optionally: applying a liquid-crystalline composition (a) to the product from step (i.1) or (i.2), said composition being selected from
  (a.1) a composition comprising at least one achiral nematic polymerizable monomer and optionally at least one chiral polymerizable monomer;
  (a.2) a composition comprising at least one cholesteric polymerizable monomer;
  (a.3) a composition comprising at least one cholesteric crosslinkable polymer;
  (a.4) a composition comprising at least one cholesteric polymer in a polymerizable diluent; and
  (a.5) a mixture of at least two of these compositions;
  optionally aligning, and at least partly hardening the composition;

(i.4) optionally: applying an alignment layer to the layer obtained in step (i.3) or to part of the layer obtained in step (i.3) and optionally cleaning and/or generating a preferential direction on the alignment layer or on part of the alignment layer;

(i.5.1) optionally: applying a composition (a.1), (a.2), (a.3), (a.4) or (a.5) to the product obtained in step (i.3) or (i.4), optionally aligning, and at least partly hardening the composition; where the layer obtained in step (i.5.1) differs from the layer obtained in step (i.3) in terms of chirality and/or the wavelength range reflected; or (i.5.2) optionally: applying a λ/2 film to the layer obtained in step (i.3) and then applying the same composition as in step (i.3) to the λ/2 film, optionally aligning, and at least partly hardening the composition;

(i.6) optionally: once or more than once repeating steps (i.2) to (i.5), using, in the repetitions, compositions which differ from compositions of the preceding steps (i.3) and (i.5);

(i.7) optionally: applying an alignment layer to the product obtained in step (i.5) or (i.6) or to part of the product obtained in step (i.5) or (i.6) and optionally cleaning and/or generating a preferential direction on the alignment layer or on part of the alignment layer;

(ii) applying a composition as defined in any of claims 1 and 7 to 21;

(iii) optionally aligning the composition applied in step (ii) or part of the composition applied in step (ii);

(iv) at least partly removing the dispersion medium optionally present;
(v) polymerizing the at least one monomer present in the composition under the action of UV light;
(vi) optionally thermally aftertreating the product obtained in step (v);
(vii) optionally post-curing the product obtained in step (v) or (vi) under the action of UV light;
(viii.1) optionally: applying an alignment layer to the product obtained in step (v),
(vi) or (vii) and optionally cleaning and/or generating a preferential direction on the alignment layer;
(viii.2) optionally: applying a liquid-crystalline composition (b) selected from
  (b.1) a composition comprising at least one achiral nematic polymerizable monomer and optionally at least one chiral polymerizable monomer;
  (b.2) a composition comprising at least one cholesteric polymerizable monomer;
  (b.3) a composition comprising at least one cholesteric crosslinkable polymer;
  (b.4) a composition comprising at least one cholesteric polymer in a polymerizable diluent; and
  (b.5) a mixture of at least two of these compositions;
  optionally aligning, and at least partly hardening the composition;
(viii.3) optionally: applying an alignment layer to the layer obtained in step (viii.2) and optionally cleaning and/or generating a preferential direction on the alignment layer;
(viii.4.1) optionally: applying a composition (b.1), (b.2), (b.3), (b.4) or (b.5) to the product obtained in step (viii.2) or (viii.3), optionally aligning, and at least partly hardening the composition; where the layer obtained in step (viii.4.1) differs from the layer obtained in step (viii.2) in terms of chirality and/or the wavelength range reflected; or
(viii.4.2) optionally: applying a λ/2 film to the layer obtained in step (viii.2) and then applying the same composition as in step (viii.2) to the λ/2 film, optionally aligning and at least partly hardening the composition;
(viii.5) optionally: once or more than once repeating steps (viii.1.2) to (viii.4), using, in the repetitions, compositions which differ from compositions of the preceding steps (viii.2) and (viii.4);
(ix) optionally: detaching the carrier film;
(x) optionally: applying a protective layer, an adhesive layer and/or a release layer to the last layer(s) obtained;
with the proviso that step (vi) is carried out if step (v) is carried out at a temperature of below 60° C.

In a preferred embodiment the polymerization in step (v) is carried out at elevated temperature.

Thus, in a preferred embodiment the inventive product which, in addition to the layer obtained in steps (ii) to (vii), also comprises further layers is obtainable by a process A.1 comprising the following steps:

(i.1) providing a carrier film or a substrate and optionally cleaning the carrier film or the substrate and/or generating a preferential direction on the film or substrate surface or on part of the film or substrate surface;
(i.2) optionally: applying an alignment layer to the carrier film or the substrate or to part of the carrier film or of the substrate and optionally cleaning and/or generating a preferential direction on the alignment layer or on part of the alignment layer;
(i.3) optionally: applying a liquid-crystalline composition (a) to the product from step (i.1) or (i.2), said composition being selected from
  (a.1) a composition comprising at least one achiral nematic polymerizable monomer and optionally at least one chiral polymerizable monomer;
  (a.2) a composition comprising at least one cholesteric polymerizable monomer;
  (a.3) a composition comprising at least one cholesteric crosslinkable polymer;
  (a.4) a composition comprising at least one cholesteric polymer in a polymerizable diluent; and
  (a.5) a mixture of at least two of these compositions;
  optionally aligning, and at least partly hardening the composition;
(i.4) optionally: applying an alignment layer to the layer obtained in step (i.3) or to part of the layer obtained in step (i.3) and optionally cleaning and/or generating a preferential direction on the alignment layer or on part of the alignment layer;
(i.5.1) optionally: applying a composition (a.1), (a.2), (a.3), (a.4) or (a.5) to the product obtained in step (i.3) or (i.4), optionally aligning, and at least partly hardening the composition; where the layer obtained in step (i.5.1) differs from the layer obtained in step (i.3) in terms of chirality and/or the wavelength range reflected; or
(i.5.2) optionally: applying a λ/2 film to the layer obtained in step (i.3) and then applying the same composition as in step (i.3) to the λ/2 film, optionally aligning, and at least partly hardening the composition;
(i.6) optionally: once or more than once repeating steps (i.2) to (i.5), using, in the repetitions, compositions which differ from compositions of the preceding steps (i.3) and (i.5);
(i.7) optionally: applying an alignment layer to the product obtained in step (i.5) or (i.6) or to part of the product obtained in step (i.5) or (i.6) and optionally cleaning and/or generating a preferential direction on the alignment layer or on part of the alignment layer;
(ii) applying a composition as defined in any of claims 1 and 7 to 21;
(iii) optionally aligning the composition applied in step (ii) or part of the composition applied in step (ii);
(iv) at least partly removing the dispersion medium optionally present;
(v) polymerizing the at least one monomer present in the composition under the action of UV light at a temperature of from 60 to 140° C.;
(vi) optionally thermally aftertreating the product obtained in step (v);
(vii) optionally post-curing the product obtained in step (v) or (vi) under the action of UV light;
(viii.1) optionally: applying an alignment layer to the product obtained in step (v), (vi) or (vii) and optionally cleaning and/or generating a preferential direction on the alignment layer;
(viii.2) optionally: applying a liquid-crystalline composition (b) selected from
  (b.1) a composition comprising at least one achiral nematic polymerizable monomer and optionally at least one chiral polymerizable monomer;
  (b.2) a composition comprising at least one cholesteric polymerizable monomer;
  (b.3) a composition comprising at least one cholesteric crosslinkable polymer;
  (b.4) a composition comprising at least one cholesteric polymer in a polymerizable diluent; and
  (b.5) a mixture of at least two of these compositions;

optionally aligning, and at least partly hardening the composition;
(viii.3) optionally: applying an alignment layer to the layer obtained in step (viii.2) and optionally cleaning and/or generating a preferential direction on the alignment layer;
(viii.4.1) optionally: applying a composition (b.1), (b.2), (b.3), (b.4) or (b.5) to the product obtained in step (viii.2) or (viii.3), optionally aligning, and at least partly hardening the composition; where the layer obtained in step (viii.4.1) differs from the layer obtained in step (viii.2) in terms of chirality and/or the wavelength range reflected; or
(viii.4.2) optionally: applying a $\lambda/2$ film to the layer obtained in step (viii.2) and then applying the same composition as in step (viii.2) to the $\lambda/2$ film, optionally aligning and at least partly hardening the composition;
(viii.5) optionally: once or more than once repeating steps (viii.1.2) to (viii.4), using, in the repetitions, compositions which differ from compositions of the preceding steps (viii.2) and (viii.4);
(ix) optionally: detaching the carrier film;
(x) optionally: applying a protective layer, an adhesive layer and/or a release layer to the last layer(s) obtained.

In an alternatively preferred embodiment, the thermal aftertreatment in step (vi) is carried out.

Thus, in an alternatively preferred embodiment the inventive product which, in addition to the layer obtained in steps (ii) to (vii), also comprises further layers is obtainable by a process B.1 comprising the following steps:
(i.1) providing a carrier film or a substrate and optionally cleaning the carrier film or the substrate and/or generating a preferential direction on the film or substrate surface or on part of the film or substrate surface;
(i.2) optionally: applying an alignment layer to the carrier film or the substrate or to part of the carrier film or of the substrate and optionally cleaning and/or generating a preferential direction on the alignment layer or on part of the alignment layer;
(i.3) optionally: applying a liquid-crystalline composition (a) to the product from step
  (i.1) or (i.2), said composition being selected from
  (a.1) a composition comprising at least one achiral nematic polymerizable monomer and optionally at least one chiral polymerizable monomer;
  (a.2) a composition comprising at least one cholesteric polymerizable monomer;
  (a.3) a composition comprising at least one cholesteric crosslinkable polymer;
  (a.4) a composition comprising at least one cholesteric polymer in a polymerizable diluent; and
  (a.5) a mixture of at least two of these compositions; optionally aligning, and at least partly hardening the composition;
(i.4) optionally: applying an alignment layer to the layer obtained in step (i.3) or to part of the layer obtained in step (i.3) and optionally cleaning and/or generating a preferential direction on the alignment layer or on part of the alignment layer;
(i.5.1) optionally: applying a composition (a.1), (a.2), (a.3), (a.4) or (a.5) to the product obtained in step (i.3) or (i.4), optionally aligning, and at least partly hardening the composition; where the layer obtained in step (i.5.1) differs from the layer obtained in step (i.3) in terms of chirality and/or the wavelength range reflected; or
(i.5.2) optionally: applying a $\lambda/2$ film to the layer obtained in step (i.3) and then applying the same composition as in step (i.3) to the $\lambda/2$ film, optionally aligning, and at least partly hardening the composition;
(i.6) optionally: once or more than once repeating steps (i.2) to (i.5), using, in the repetitions, compositions which differ from compositions of the preceding steps (i.3) and (i.5);
(i.7) optionally: applying an alignment layer to the product obtained in step (i.5) or (i.6) or to part of the product obtained in step (i.5) or (i.6) and optionally cleaning and/or generating a preferential direction on the alignment layer or on part of the alignment layer;
(ii) applying a composition as defined above;
(iii) optionally aligning the composition applied in step (ii) or part of the composition applied in step (ii);
(iv) at least partly removing the dispersion medium optionally present;
(v) polymerizing the at least one monomer present in the composition under the action of UV light; and
(vi) thermally aftertreating the product obtained in step (v);
(vii) optionally post-curing the product obtained in step (v) or (vi) under the action of UV light;
(viii.1) optionally: applying an alignment layer to the product obtained in step (vi) or (vii) and optionally cleaning and/or generating a preferential direction on the alignment layer;
(viii.2) optionally: applying a liquid-crystalline composition (b) selected from
  (b.1) a composition comprising at least one achiral nematic polymerizable monomer and optionally at least one chiral polymerizable monomer;
  (b.2) a composition comprising at least one cholesteric polymerizable monomer;
  (b.3) a composition comprising at least one cholesteric crosslinkable polymer;
  (b.4) a composition comprising at least one cholesteric polymer in a polymerizable diluent; and
  (b.5) a mixture of at least two of these compositions; optionally aligning, and at least partly hardening the composition;
(viii.3) optionally: applying an alignment layer to the layer obtained in step (viii.2) and optionally cleaning and/or generating a preferential direction on the alignment layer;
(viii.4.1) optionally: applying a composition (b.1), (b.2), (b.3), (b.4) or (b.5) to the product obtained in step (viii.2) or (viii.3), optionally aligning, and at least partly hardening the composition; where the layer obtained in step (viii.4.1) differs from the layer obtained in step (viii.2) in terms of chirality and/or the wavelength range reflected; or
(viii.4.2) optionally: applying a $\lambda/2$ film to the layer obtained in step (viii.2) and then applying the same composition as in step (viii.2) to the $\lambda/2$ film, optionally aligning and at least partly hardening the composition;
(viii.5) optionally: once or more than once repeating steps (viii.1.2) to (viii.4), using, in the repetitions, compositions which differ from compositions of the preceding steps (viii.2) and (viii.4);
(ix) optionally: detaching the carrier film;
(x) optionally: applying a protective layer, an adhesive layer and/or a release layer to the last layer(s) obtained.

When one or more of steps (i.2) to (i.7) is performed, a coated carrier film or a coated substrate is obtained at the end of overall step (i).

The preferential direction can be generated on only part of the film or substrate surface (step (i.1)) or only part of the alignment layer. It is likewise possible to apply the alignment layer only to part of the surface below. This affords films or substrates in which only the aligned part is recognizable as having line or fingerprint texture under the microscope or in another imaging process; the rest of the surface appears diffuse. In this way, it is possible to individually realize laminated markings.

When the inventive product, in addition to the layer formed by steps (ii) to (vii), should also comprise one or more further layers, it is preferred not to perform steps (viii.1) to (viii.5), but instead one or more of steps (i.2) to (i.7).

The carrier film or the substrate can be cleaned in step (i.1) and also in the above general step (i), or the alignment layer can be cleaned, by means of common processes, such as ultrasound, rolling, for example with a Teknek roller, rubbing, for example with velvet, blowing with dry filtered air, blowing with ionized air or nitrogen, etching by atomization or etching by sputtering with argon or reactive gases under reduced pressure (plasma process), plasma processes at atmospheric pressure, corona process, UV treatment and/or ozone treatment.

A preferential direction is generated on the film or substrate surface, for example, by stretching the carrier film and/or by single or multiple unidirectional rubbing with velvet or microfiber cloths. Alternatively or additionally, a preferential direction is generated chemically on the film surface by applying an alignment layer (step II), which is in turn cleaned like the carrier film and/or provided with a preferential direction.

The way in which the alignment layer is suitably applied to the carrier film or to the substrate in step (i.2) or to an at least partly hardened liquid-crystalline layer (for example in step (i.4), (i.7), (viii.1) or (viii.3)) depends greatly on the substances which are to form the alignment layer. For example, to obtain a polyimide alignment layer, as already mentioned, the corresponding polyamide acid can be applied and then hardened, which can be accomplished, for example, thermally by heating. The polyamide acid or the polyvinyl alcohol, which is also suitable for producing alignment layers, are applied, for example, as a solution or suspension and freed of the solvent. Inorganic layers, such as silicon dioxide, are obtained by specific processes, such as cathode atomization or biased vapor deposition.

Compositions (a.1), (a.2), (a.3), (a.4) or (a.5), or (b.1), (b.2), (b.3), (b.4) or (b.5), are generally used in the form of a solution or of an aqueous suspension or emulsion. They are generally applied by means of customary processes, for example by means of processes selected from airblade coating, knife coating, airknife coating, squeegee coating, impregnation coating, reverse roll coating, transfer roll coating, gravure coating, kiss coating, flow coating, spray coating, spin coating, or printing processes such as relief printing, gravure printing, flexographic printing, offset printing, inkjet printing, letterpress printing, pad printing, heatseal printing or screenprinting processes.

The alignment of the cholesteric layer generally proceeds spontaneously during the applying operation; it can, however, also be effected in a downstream step. In this case, the alignment is effected by means of the known methods, for example the interaction of the liquid-crystal phase with alignment layers, the application of electrical or magnetic fields, or the mechanical knife coating of the liquid-crystal layers. However, the alignment preferably proceeds spontaneously under the action of the shear forces which act in the course of application.

Subsequently, the cholesteric layer applied can be dried by means of customary processes, for example with hot air.

The cholesteric layer can be polymerized thermally, by means of an electron beam or preferably photochemically. When the compositions (a.1), (a.2), (a.3), (a.4) or (a.5), or (b.1), (b.2), (b.3), (b.4) or (b.5), are to be polymerized photochemically, they may comprise commercial photoinitiators. For curing by means of electron beams, they are unnecessary. Suitable photoinitiators are those mentioned above in B.1.

Suitable achiral nematic polymerizable compounds of composition (a.1) or (b.1) correspond to those mentioned above in the description of step (ii), although, as already stated, the restriction that at least one nematic compound must be polymerizable under the action of UV light does not apply here. Preferred achiral nematic polymerizable monomers of composition (a.1) are polyfunctionally and especially difunctionally polymerizable and correspond preferably to the general formula I. Reference is made to the above remarks.

Suitable polymerizable chiral compounds of composition (a.1) or (b.1) correspond to those mentioned above in the description of step (ii). According to the selection of the weight ratio between nematic and chiral compounds, a layer which reflects wavelengths in the spectral region of the UV, of visible light and/or of the IR is obtained after the polymerization. Preference is given to selecting, as stated, the weight ratio such that the layer formed possesses at least one reflection maximum in the spectral region of visible light (i.e. between 250 and 750 nm).

Alternatively, composition (a) or (b) may comprise at least one cholesteric polymerizable monomer of composition (a.2) or (b.2) in hardened form.

Preferred monomers of group (a.2) or (b.2) are described in DE-A 19602848, to which full reference is hereby made. More particularly, the monomers comprise at least one cholesteric polymerizable monomer of the formula XIII

$$(Z^1-Y^1-A^1-Y^2-M-Y^3)_n X \qquad (XIII)$$

The variables are each as defined above. The preferred configurations apply correspondingly.

Alternatively, composition (a) or (b) may comprise at least one cholesterically crosslinkable polymer of composition (a.3) or (b.3).

Preferred polymers of group (a.3) or (b.3) are described in WO 2008/012292 and in the literature cited therein, to which full reference is hereby made.

Alternatively, composition (a) or (b) may comprise a cholesteric polymer in a polymerizable diluent (composition (a.4) or (b.4)).

Preferred polymers and diluents of group (a.4) or (b.4) are described in WO 2008/012292 and in the literature cited therein, to which full reference is hereby made. Preferred polymers of group (a.4) or (b.4) are, for example, crosslinkable cholesteric copolyisocyanates as described in U.S. Pat. No. 8,834,745, to which full reference is hereby made.

If desired, compositions (a.1), (a.2), (a.3), (a.4) and (a.5), or (b.1), (b.2), (b.3), (b.4) and (b.5), may comprise, in addition to the components responsible for the reflection behavior which have already been mentioned, further mixture constituents which are preferably selected from the abovementioned dispersants and components B to E.

With regard to steps (ii) to (vii), reference is made to the above remarks.

If a preferential direction is not generated over the entire area of an isotropic carrier film or of an isotropic substrate, or an alignment layer is not applied over the entire area of a carrier film or of a substrate, or not the entire cholesteric layer applied is aligned, the result is a product in which diffuse regions (those regions on which no preferential direction has been generated/no alignment layer has been applied/has not been aligned) are present alongside optimally aligned regions with different optical properties. It is possible in this way to obtain images, for example logos or hidden information, which is visible under the microscope or between two polarizers.

The invention further provides for the use of inventive polymerized films or coated substrates as optical filters, polarizers, decorative media, forgeryproof markers, reflective media, antireflective media or for focusing light (for example in solar cells). The invention also provides for the use of inventive polymerized films as an antibacterial coating.

The invention also relates to a forgeryproof marker or a forgeryproof marking (also referred to as security features or security marking), comprising an inventive polymerized film with line texture or fingerprint texture, preferably with line texture.

The articles to be marked with a forgeryproof marking are, for example, products of value of any nature, the forgery of which is to be prevented, for example banknotes, shares and other securities, cheque or credit cards, ID, tickets and coupons of value, but also packaging of high-cost consumer goods, pharmaceuticals and luxury goods, or such luxury goods themselves. With regard to the latter, the key is to prevent or at least complicate brand piracy.

The inventive security feature comprises detectable features which are hidden by virtue of the line or fingerprint texture and especially by virtue of the line texture, and which can be detected by means of optical methods (for example by passing a radiation source through the marked article (more specifically: the polymerized film with line or fingerprint texture), preferably a monochromatic radiation source, for example a laser in the UV, VIS or NIR region; evaluating the distance between points of high radiation intensity which result from constructive interference, either qualitatively or—more precisely—by the diffraction formula for optical gratings, for example the Bragg equation, by measuring the distance, for example by means of a photodiode array).

The invention further provides a process for detecting a forgeryproof marking comprising a polymerized film with line texture on or in an article provided therewith, comprising the following steps:
(a) providing an article with an inventive forgeryproof marking, comprising a polymerized film with line texture;
(b) introducing the article from step (a) between a monochromatic radiation source and the surface of a detector at a defined distance between the forgeryproof marker and the surface of the detector;
(c) irradiating the article with electromagnetic radiation of defined wavelength from the radiation source from step (b); and
(d) evaluating the distance between points of high radiation intensity which occur on the surface of the detector, either qualitatively or quantitatively, by measuring the distance between points of high radiation intensity.

The monochromatic radiation source is preferably a laser in the UV, near IR or visible spectral region.

The distance between points of high radiation intensity can be measured, for example, by means of a photodiode array.

The detection process according to the invention may be automated and may be performed, for example, with the aid of a machine or of a portable instrument. The machine may, for example, be an automated teller machine, automated travel ticket machine, automated entry ticket machine, automated parking ticket machine, automated postage stamp machine, automated parcel machine and the like.

The inventive forgeryproof markings may of course be combined with numerous further security features.

For example, a substrate provided with an inventive forgeryproof marking may be equipped with further layers comprising security features. Examples of further layers are layers equipped with fluorescent, IR-transparent and/or IR-absorbent or reflective substances, magnetic and/or electrically active layers, thermochromic layers, fluorescent layers and layers which comprise markers, for example DNA tags, nanotubes or biomarkers.

Additionally claimed is the use of the inventive polymerized films and substrates as optical filters, especially polarizing color filters and notch filters, i.e. narrowband interference filters, as polarizers, especially for liquid-crystal displays and visual-display units, as decorative media, especially for laminating purposes, as a forgeryproof marker, especially for cheque and credit cards, banknotes and ID, and as reflective media for the selective reflection of radiation in a predefined wavelength range.

The invention further provides pigments obtainable by comminuting the inventive polymerized film (of course after removal from the carrier film) and optionally separating the resulting platelet-shaped pigment particles by size. The invention also relates to the use of such pigments as or in optical filters, polarizers, decorative media, forgeryproof markers, reflective media, antireflective media or for focusing light (in solar cells).

The process according to the invention affords films with defined surface texture. The line texture in particular is of interest, since the film with line texture behaves like an optical grating: when polychromic light (for example sunlight or light from a simple incandescent lamp) is passed through such a film, a prism spectrum is observed. When monochromatic light is passed through the film, the electromagnetic waves are diffracted according to the diffraction law for optical gratings (cf. Bragg law), and constructive interference results in points of high radiation intensity (maxima) which are clearly discernible in the reflection and are identified unambiguously by characteristic distances defined by the composition of step (ii).

The invention is now illustrated in detail by the nonlimiting examples which follow and the FIGURE.

EXAMPLES

1.) Formulations

Formulation 1:
Achiral nematic compound: compound of the formula I.1.1;
Concentration of the nematic: 24% by weight based on the total weight of the formulation
Solvent: cyclopentanone
Leveling additive: Byk 361N, 1% in cyclopentanone
Photoinitiator: Irgacure® 907
Photoinitiator concentration: 3% by weight based on the total weight of the formulation
Formulation 2:
Achiral nematic compound: compound of the formula I.1.1;
Concentration of the nematic: 24% by weight based on the total weight of the formulation
Solvent: cyclopentanone
Leveling additive: Byk 361 N, 1% in cyclopentanone
Photoinitiator: Irgacure® 127
Photoinitiator concentration: 3% by weight based on the total weight of the formulation
Formulation 3:
Achiral nematic compound: compound of the formula I.1.1+ compound of the formula I.2.1; weight ratio 1:1;
Concentration of the nematic: 24% by weight based on the total weight of the formulation
Solvent: cyclopentanone
Leveling additive: Byk 361N, 1% in cyclopentanone
Photoinitiator: Irgacure® 907

Photoinitiator concentration: 3% by weight based on the total weight of the formulation Formulation 4:

Achiral nematic compound: compound of the formula I.1.1+compound of the formula I.2.2; weight ratio 1:1;

Concentration of the nematic: 24% by weight based on the total weight of the formulation Solvent: cyclopentanone Leveling additive: Byk 361 N, 1% in cyclopentanone Photoinitiator: Irgacure® 907

Photoinitiator concentration: 3% by weight based on the total weight of the formulation 2.) Production of Coated Films Film 1:

A Lumirror 4001 film (polyethylene terephthalate) was polished with velvet and then coated with each of the above formulations by means of a 15 µm doctor blade (film thickness approx. 1.5 µm), dried in an oven at 130° C. for 5 min and polymerized by means of UV light (40 mW/cm²) for 2 min. Subsequently, the film was subjected to a thermal aftertreatment at 130° C. for 10 s.

Film 2:

A Lumirror 96 µm film (polyethylene terephthalate) was polished with velvet and then coated with formulation 1 by means of a 15 µm doctor blade (film thickness approx. 1.7 µm), dried in an oven at 120° C. for 5 min and polymerized by means of UV light (40 mW/cm²) for 2 min at a temperature of 60° C. (film 2.1), 80° C. (film 2.2), 100° C. (film 2.3) or 110° C. (film 2.4). The heat originated from a heatable aluminum plate on which the Lumirror film was placed. Subsequently, the film was subjected to a thermal aftertreatment at 110° C. for 90 s.

Film 3:

A Lumirror 96 µm film (polyethylene terephthalate) was polished with velvet and then coated with formulation 1 by means of a 15 µm doctor blade (film thickness approx. 1.7 µm), dried in an oven at 120° C. for 5 min and polymerized by means of UV light (40 mW/cm²) for 2 min at a temperature of 100° C. The heat originated from a heatable aluminum plate on which the Lumirror film was placed. A thermal aftertreatment was not carried out.

Film 4

A Lumirror 96 µm film (polyethylene terephthalate) was polished with velvet and then coated with formulation 1 by means of a 15 µm doctor blade (film thickness approx. 1.7 µm), dried in an oven at 120° C. for 5 min and polymerized by means of UV light (UV-AB surface-emitting system from Hönle, Germany, model UV2000) for 2 min. Subsequently, the film was subjected to a thermal aftertreatment at 110° C. for 90 s. Then the film was irradiated once again for 2 min at ambient temperature (film 4.1) or 80° C. (film 4.2)

In all cases, the result was a film with line texture, which has a sinusoidal appearance in cross section. The sinusoidal "chains of mountains" of the line texture have an average height of from 1.6 to 2.6 µm and an average half width of from 8 to 16 µm. In film 2.1 the line texture was however not completely formed.

FIG. 1 shows, by way of example, the microscope image of the top view of film 1 which has been coated with formulation 1.

3.) Storage Stability 3.1) Temperature Test

After 4 weeks of storing after their preparation the films were heated at 120° C. for 30 min. In all films the line textures remained essentially unchanged.

3.2) Ironing Test

Directly after their preparation or after 4 weeks of storing the films were ironed at 140 to 160° C. for 5 min. Only in films 4.1 and 4.2 the line texture remained essentially unchanged, while in all other films the line texture disappeared. This shows that post-curing step (vii) further enhances the stability of the line texture.

The invention claimed is:

1. A polymerized film with line texture, obtained by a process comprising:
   (i) providing an optionally coated carrier film or an optionally coated substrate and optionally cleaning the carrier film or the substrate and/or generating a preferential direction on the film or substrate surface or on part of the film or substrate surface;
   (ii) applying a composition comprising at least one achiral nematic polymerizable monomer and optionally at least one dispersion medium to the film or substrate surface; where the composition comprises at least one achiral nematic polymerizable monomer which is polymerizable with UV light, the composition comprising the at least one achiral nematic polymerizable monomer which is polymerizable with UV light in an amount of at least 25% by weight, based on the total weight of the achiral nematic polymerizable monomers present in the composition;
   wherein the composition does not contain any chiral polymerizable monomer;
   (iii) optionally aligning the composition applied in (ii) or part of the composition applied in (ii);
   (iv) at least partly removing the dispersion medium optionally present;
   (v) polymerizing the at least one monomer present in the composition under the action of UV light;
   (vi) optionally thermally aftertreating the product obtained in step (v); and
   (vii) optionally post-curing the product obtained in step (v) or (vi) under the action of UV light;
   with the proviso that step (vi) is carried out if step (v) is carried out at a temperature of below 60° C.;
   where line texture means a surface characteristic which appears, when viewed under a microscope from the top, as a system of substantially parallel lines or strips of infinite longitudinal extent.

2. A forgeryproof marker comprising the polymerized film with line texture according to claim 1.

3. The polymerized film of claim 1, wherein the at least one achiral nematic polymerizable monomer used in step (ii)

comprises at least one difunctionally polymerizable achiral nematic monomer of the formula I:

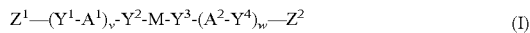  (I)

in which
- $Z^1$, $Z^2$ are identical or different reactive groups through which polymerization can be effected, or radicals which comprise such reactive groups, where the reactive groups are selected from C=C double bonds, C≡C triple bonds, oxirane, thiirane, azirane, cyanate, thiocyanate, isocyanate, carboxylic acid, hydroxyl or amino groups;
- $Y^1$, $Y^2$, $Y^3$, $Y^4$ are each independently a chemical bond, —O—, —S—, —CO—O—, —O—CO—, —O—CO—O—, —CO—S—, —S—CO—, —CO—N($R^a$)—, —N($R^a$)—CO—, —N($R^a$)—CO—O—, —N($R^a$)—CO—N($R^a$)—, —CH$_2$—O—, —O—CH$_2$—,
  where $R^a$ is hydrogen or $C_1$-$C_4$-alkyl;
- $A^1$, $A^2$ are identical or different spacers selected from linear $C_2$-$C_{30}$-alkylene groups, preferably $C_2$-$C_{12}$-alkylene groups, which may be interrupted by oxygen, sulfur and/or optionally monosubstituted nitrogen, where these interrupting groups must not be adjacent; where suitable amine substituents comprise $C_1$-$C_4$-alkyl groups, where the alkylene chains may be substituted by fluorine, chlorine, bromine, cyano, methyl or ethyl;
- v and w are each independently 0, 1 or 2;
- M is a mesogenic group of the general formula II:

$(T^1-Y^5)_y-T^2$  (II)

in which
- each $T^1$ is independently a divalent alicyclic, saturated or partially unsaturated heterocyclic, aromatic or heteroaromatic radical;
- $T^2$ is defined independently as $T^1$ or is a —CH=N—N=CH— group;
- $Y^5$ is identical or different bridging members —CO—O—, —O—CO—, —CH$_2$—O—, —O—CH$_2$—, —CO—S—, —S—CO—, —CH$_2$—S—, —S—CH$_2$—, —CH=N—, —N=CH—, —CH=N—N=CH—, —C≡C—, —CH=CH—, —C(CH$_3$)=CH$_2$, —CH=CH(CH$_3$)— or a direct bond, and
- y is 0, 1, 2 or 3.

4. The polymerized film of claim 3, wherein the at least one achiral nematic polymerizable monomer used in step (ii) comprises at least one difunctionally polymerizable achiral nematic monomer of formula:

I.1

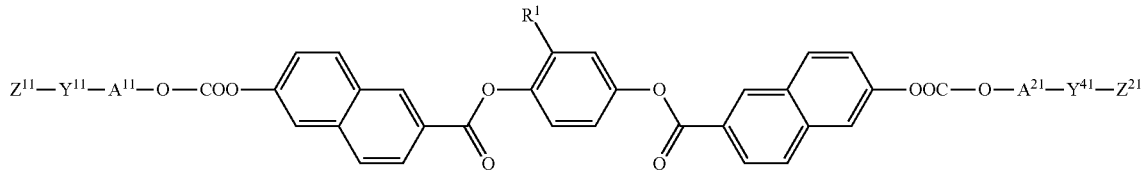

in which
$Z^{11}$ and $Z^{21}$ are each independently

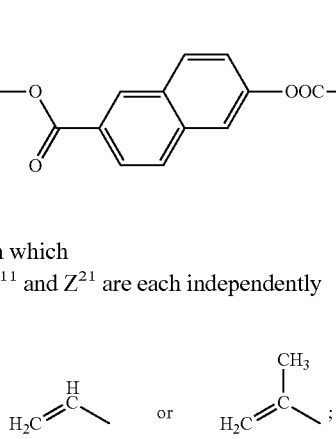

$A^{11}$ and $A^{21}$ are each independently alkylene groups having 2 to 8 carbon atoms, $Y^{11}$ and $Y^{41}$ are each independently a chemical single bond, oxygen, —CO—, —O—CO— or —CO—O—; and $R^1$ is hydrogen, $C_1$-$C_6$-alkyl, $C_1$-$C_6$-alkoxy or CO—O—$C_1$-$C_6$-alkyl;

and optionally at least one difunctionally polymerizable achiral nematic monomer of the formula I.2:

I.2

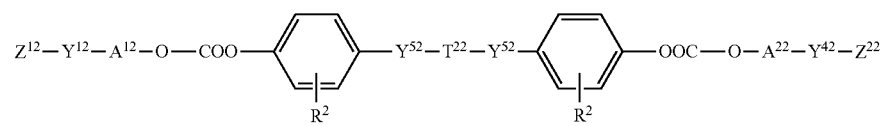

in which
$T^{22}$ is a divalent radical of the formula:

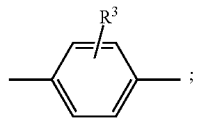

is a divalent 5- or 6-membered heteroaromatic radical having 1, 2 or 3 heteroatoms selected from N, O and S as ring members, or is a —CH=N—N=CH— group;

$Z^{12}$ and $Z^{22}$ are each independently

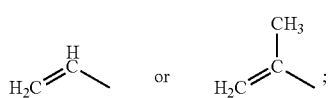

$A^{12}$ and $A^{22}$ are each independently alkylene groups having 2 to 8 carbon atoms, $Y^{12}$ and $Y^{42}$ are each independently a chemical single bond, oxygen, —CO—, —O—CO— or —CO—O—;

$Y^{52}$ is a chemical single bond, oxygen, —CO—, —O—CO— or —CO—O—, with the proviso that $Y^{52}$ is a chemical single bond when $T^{22}$ is a —CH=N—N=CH— group;

$R^2$ is hydrogen, $C_1$-$C_6$-alkyl, $C_1$-$C_6$-alkoxy or CO—O—$C_1$-$C_6$-alkyl; and $R^3$ is hydrogen, $C_1$-$C_6$-alkyl, $C_1$-$C_6$-alkoxy or CO—O—$C_1$-$C_6$-alkyl.

5. The polymerized film of claim 4, wherein the monomer I.1 used is a compound of the formula (I.1.1):

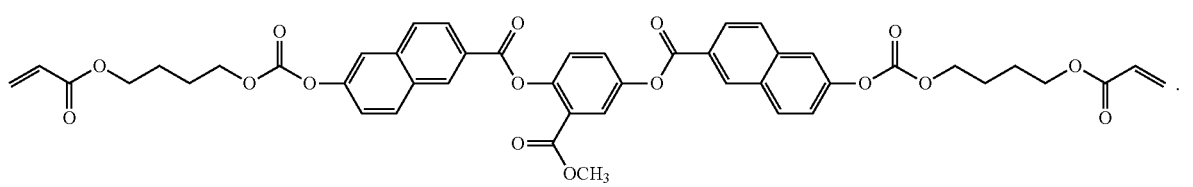
(I.1.1)

6. The polymerized film of claim 3, wherein the at least one difunctionally polymerizable achiral nematic monomer of the formula (I) is represented by the formula (I.2.1), (I.2.2), (I.2.3) or (I.2.4):

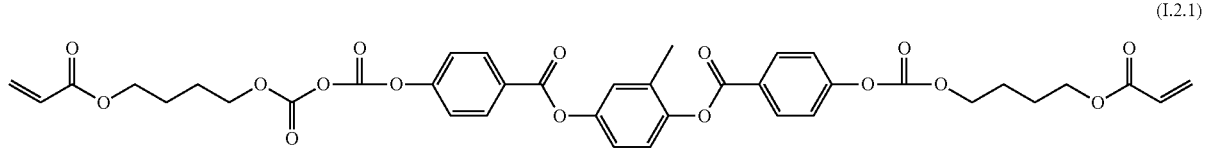
(I.2.1)

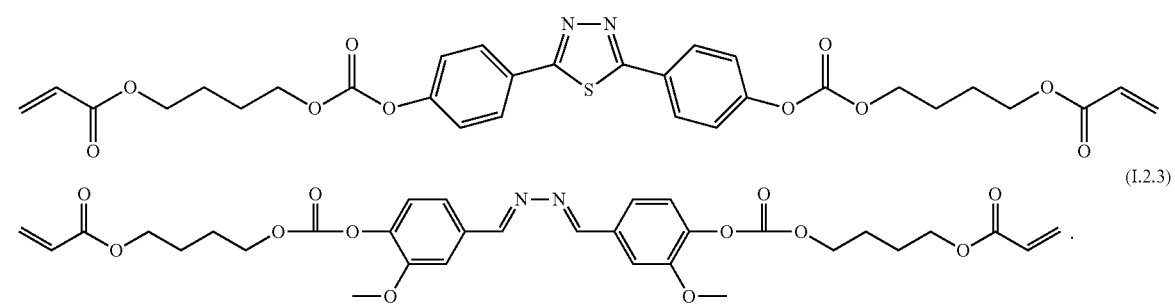
(I.2.2)

(I.2.3)

7. An optical filter, polarizer, decorative media, forgeryproof marker, reflective media, or an antireflective media comprising the polymerized film of claim 1.

8. A method for preparing the polymerized film of claim 1, comprising:
(i) providing an optionally coated carrier film or an optionally coated substrate and optionally cleaning the carrier film or the substrate and/or generating a preferential direction on the film or substrate surface or on part of the film or substrate surface;
(ii) applying a composition comprising at least one achiral nematic polymerizable monomer and optionally at least one dispersion medium to the film or substrate surface; where the composition comprises at least one achiral nematic polymerizable monomer which is polymerizable with UV light, the composition comprising the at least one achiral nematic polymerizable monomer which is polymerizable with UV light in an amount of at least 25% by weight, based on the total weight of the achiral nematic polymerizable monomers present in the composition;
wherein the composition does not contain any chiral polymerizable monomer;
(iii) optionally aligning the composition applied in (ii) or part of the composition applied in (ii);
(iv) at least partly removing the dispersion medium optionally present;
(v) polymerizing the at least one monomer present in the composition under the action of UV light;
(vi) optionally thermally aftertreating the product obtained in step (v); and
(vii) optionally post-curing the product obtained in step (v) or (vi) under the action of UV light;
with the proviso that step (vi) is carried out if step (v) is carried out at a temperature of below 60° C.

9. A substrate coated with a polymerized film with line texture, obtained by a process comprising:
(i) providing an optionally coated carrier film or an optionally coated substrate and optionally cleaning the carrier film or the substrate and/or generating a preferential direction on the film or substrate surface or on part of the film or substrate surface;
(ii) applying a composition comprising at least one achiral nematic polymerizable monomer and optionally at least one dispersion medium to the film or substrate surface; where the composition comprises at least one achiral nematic polymerizable monomer which is polymerizable with UV light, the composition comprising the at least one achiral nematic polymerizable monomer which is polymerizable with UV light in an amount of at least 25% by weight, based on the total weight of the achiral nematic polymerizable monomers present in the composition;

wherein the composition does not contain any chiral polymerizable monomer;

(iii) optionally aligning the composition applied in (ii) or part of the composition applied in (ii);

(iv) at least partly removing the dispersion medium optionally present;

(v) polymerizing the at least one monomer present in the composition under the action of UV light;

(vi) optionally thermally aftertreating the product obtained in step (v); and (vii) optionally post-curing the product obtained in step (v) or (vi) under the action of UV light;

with the proviso that step (vi) is carried out if step (v) is carried out at a temperature of below 60° C.;

where line texture means a surface characteristic which appears, when viewed under a microscope from the top, as a system of substantially parallel lines or strips of infinite longitudinal extent.

10. The substrate of claim 9, wherein the at least one achiral nematic polymerizable monomer used in step (ii) comprises these interrupting groups must not be adjacent; where suitable amine substituents comprise $C_1$-$C_4$-alkyl groups, where the alkylene chains may be substituted by fluorine, chlorine, bromine, cyano, methyl or ethyl;

v and w are each independently 0, 1 or 2;

M is a mesogenic group of the general formula II:

in which each $T^1$ is independently a divalent alicyclic, saturated or partially unsaturated heterocyclic, aromatic or heteroaromatic radical;

$T^2$ is defined independently as $T^1$ or is a —CH═N—N═CH— group;

$Y^5$ is identical or different bridging members —CO—O—, —O—CO—, —CH$_2$—O—, —O—CH$_2$—, —CO—S—, —S—CO—, —CH$_2$—S—, —S—CH$_2$, —CH═N—, —N═CH—, —CH═N—N═CH—, —C≡C—, —CH═CH—, —C(CH$_3$)═CH$_2$, —CH═CH(CH$_3$)— or a direct bond, and y is 0, 1, 2 or 3.

11. The substrate of claim 10, wherein the at least one achiral nematic polymerizable monomer used in step (ii) comprises at least one difunctionally polymerizable achiral nematic monomer of formula:

I.1

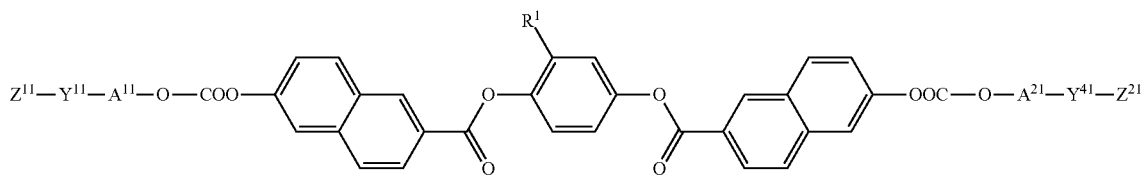

at least one difunctionally polymerizable achiral nematic monomer of the formula I:

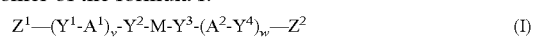

in which $Z^1$, $Z^2$ are identical or different reactive groups through which polymerization can be effected, or radicals which comprise such reactive groups, where the reactive groups are selected from C═C double bonds, C≡C triple bonds, oxirane, thiirane, azirane, cyanate, thiocyanate, isocyanate, carboxylic acid, hydroxyl or amino groups;

$Y^1$, $Y^2$, $Y^3$, $Y^4$ are each independently a chemical bond, —O—, —S—, —CO—O—, —O—CO—, —O—CO—O—, —CO—S—, —S—CO—, —CO—N($R^a$)—, —N($R^a$)—CO—, —N($R^a$)—CO—O—, —O—CO—N($R^a$)—, —N($R^a$)—CO—N($R^a$)—, —CH$_2$—O—, —O—CH$_2$—, where $R^a$ is hydrogen or $C_1$-$C_4$-alkyl;

$A^1$, $A^2$ are identical or different spacers selected from linear $C_2$-$C_{30}$-alkylene groups, preferably $C_2$-$C_{12}$-alkylene groups, which may be interrupted by oxygen, sulfur and/or optionally monosubstituted nitrogen, where in which $Z^{11}$ and $Z^{21}$ are each independently

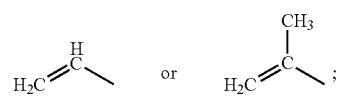

$A^{11}$ and $A^{21}$ are each independently alkylene groups having 2 to 8 carbon atoms, $Y^{11}$ and $Y^{41}$ are each independently a chemical single bond, oxygen, —CO—, —O—CO— or —CO—O—; and $R^1$ is hydrogen, $C_1$-$C_6$-alkyl, $C_1$-$C_6$-alkoxy or CO—O—$C_1$-$C_6$-alkyl;

and optionally at least one difunctionally polymerizable achiral nematic monomer of the formula I.2:

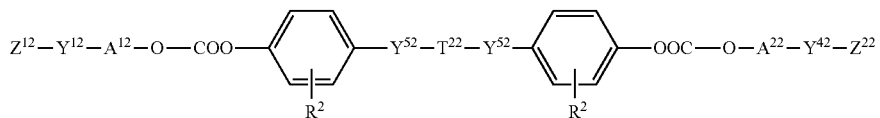

(I.2)

in which $T^{22}$ is a divalent radical of the formula:

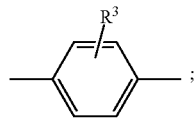

is a divalent 5- or 6-membered heteroaromatic radical having 1, 2 or 3 heteroatoms selected from N, O and S as ring members, or is a —CH=N—N=CH— group;

$Z^{12}$ and $Z^{22}$ are each independently

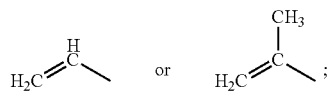

$A^{12}$ and $A^{22}$ are each independently alkylene groups having 2 to 8 carbon atoms, $Y^{12}$ and $Y^{42}$ are each independently a chemical single bond, oxygen, —CO—, —O—CO— or —CO—O—;

$Y^{52}$ is a chemical single bond, oxygen, —CO—, —O—CO— or —CO—O—, with the proviso that $Y^{52}$ is a chemical single bond when $T^{22}$ is a —CH=N—N=CH— group;

$R^2$ is hydrogen, $C_1$-$C_6$-alkyl, $C_1$-$C_6$-alkoxy or CO—O—$C_1$-$C_6$-alkyl; and $R^3$ is hydrogen, $C_1$-$C_6$-alkyl, $C_1$-$C_6$-alkoxy or CO—O—$C_1$-$C_6$-alkyl.

12. The substrate of claim 11, wherein the monomer I.1 used is a compound of the formula (I.1.1):

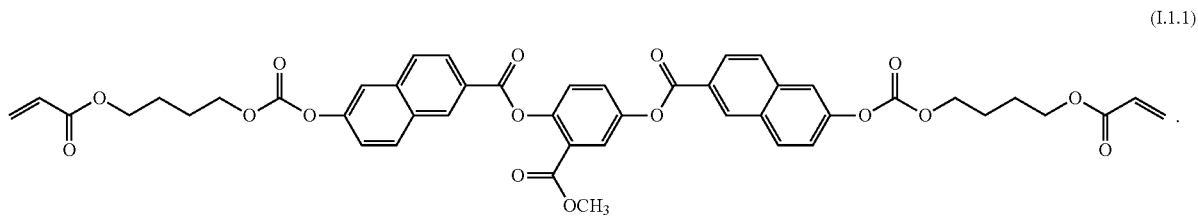 [SMILES: C=CC(=O)OCCCCOC(=O)Oc1ccc2cc(C(=O)Oc3ccc(OC(=O)c4ccc5cc(OC(=O)OCCCCOC(=O)C=C)ccc5c4)c(C(=O)OC)c3)ccc2c1]

(I.1.1)

13. The substrate of claim 10, wherein the at least one difunctionally polymerizable achiral nematic monomer of the formula (I) is represented by the formula (I.2.1), (I.2.2), (I.2.3) or (I.2.4):

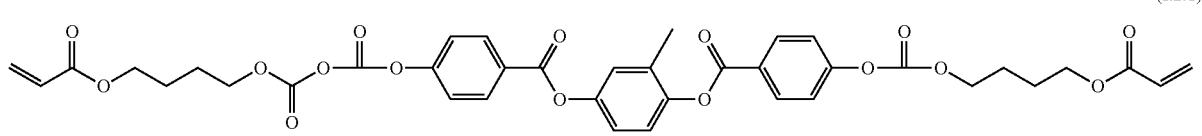

(I.2.1)

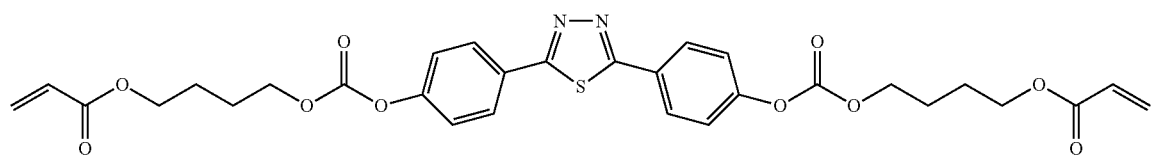

(I.2.2)

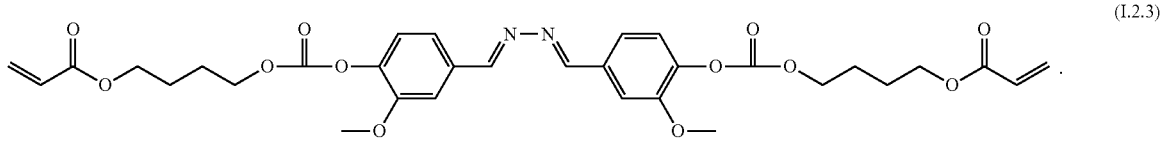

(I.2.3)

14. A method for preparing the substrate of claim 9, comprising:
   (i) providing an optionally coated carrier film or an optionally coated substrate and optionally cleaning the carrier film or the substrate and/or generating a preferential direction on the film or substrate surface or on part of the film or substrate surface;
   (ii) applying a composition comprising at least one achiral nematic polymerizable monomer and optionally at least one dispersion medium to the film or substrate surface; where the composition comprises at least one achiral nematic polymerizable monomer which is polymerizable with UV light, the composition comprising the at least one achiral nematic polymerizable monomer which is polymerizable with UV light in an amount of at least 25% by weight, based on the total weight of the achiral nematic polymerizable monomers present in the composition;

wherein the composition does not contain any chiral polymerizable monomer;
   (iii) optionally aligning the composition applied in (ii) or part of the composition applied in (ii);
   (iv) at least partly removing the dispersion medium optionally present;
   (v) polymerizing the at least one monomer present in the composition under the action of UV light;
   (vi) optionally thermally aftertreating the product obtained in step (v); and
   (vii) optionally post-curing the product obtained in step (v) or (vi) under the action of UV light;
   with the proviso that step (vi) is carried out if step (v) is carried out at a temperature of below 60° C.

15. A polymerized film with line texture on a carrier film or substrate, wherein the polymerized film comprises at least 25% by weight of units of at least one achiral nematic monomer which is polymerizable with UV light, based on the total weight of the achiral nematic polymerizable monomer units in the polymerized film, and the polymerized film does not contain units of a chiral polymerizable monomer;

where line texture means a surface characteristic which appears, when viewed under the microscope from the top, as a system of substantially parallel lines or strips of infinite longitudinal extent.

16. The polymerized film of claim 15, which consists of at least 25% by weight of units of at least one achiral nematic monomer which is polymerizable with UV light, based on the total weight of the achiral nematic polymerizable monomer units in the polymerized film.

17. A polymerized film with fingerprint texture on a carrier film or substrate, wherein the polymerized film comprises (a) units of at least one chiral polymerizable monomer and (b) at least 25% by weight of units of at least one achiral nematic monomer which is polymerizable with UV light, where the at least one achiral nematic polymerizable monomer which is polymerizable with UV light is of the formula I.1.1:

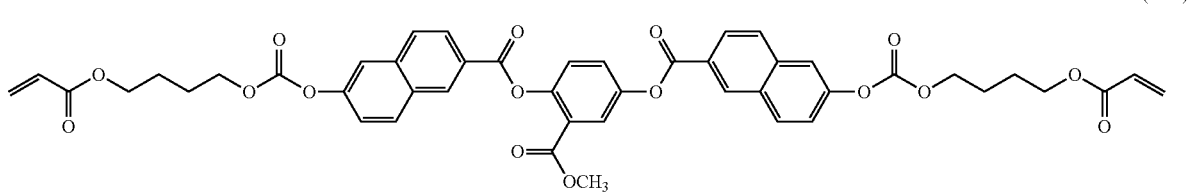

(I.1.1)

the composition comprising the at least one achiral nematic monomer which is polymerizable with UV light in an amount of at least 25% by weight based on the total weight of the achiral nematic monomer units in the polymerized film; where fingerprint texture means a surface characteristic which appears, when viewed from the top under the microscope, as a system of lines or strips reminiscent of a fingerprint or a snake's skin.

18. A polymerized film with fingerprint texture, obtained by a process comprising
   (i) providing an optionally coated carrier film or an optionally coated substrate and optionally cleaning the carrier film or the substrate and/or generating a preferential direction on the film or substrate surface or on part of the film or substrate surface;
   (ii) applying a composition comprising at least one achiral nematic polymerizable monomer and optionally at least one dispersion medium to the film or substrate surface; where the composition comprises at least one achiral nematic polymerizable monomer which is polymerizable with UV light of the formula I.1.1:

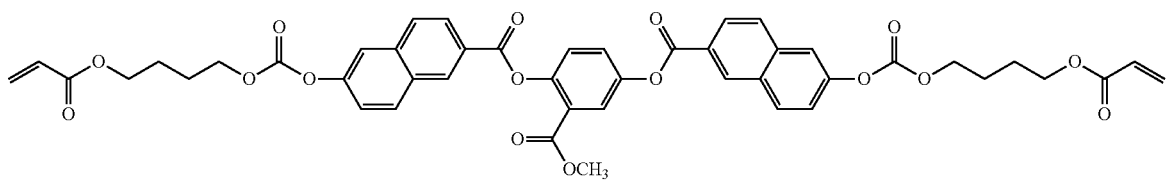
(I.1.1)

the composition comprising the at least one achiral nematic polymerizable monomer which is polymerizable with UV light of formula (I.1.1) in an amount of at least 25% by weight, based on the total weight of the achiral nematic polymerizable monomers present in the composition; and where the composition also comprises at least one chiral polymerizable monomer;
(iii) optionally aligning the composition applied in (ii) or part of the composition applied in (ii);
(iv) at least partly removing the dispersion medium optionally present;
(v) polymerizing the at least one monomer present in the composition under the action of UV light;
(vi) optionally thermally aftertreating the product obtained in step (v); and
(vii) optionally post-curing the product obtained in step (v) or (vi) under the action of UV light;
with the proviso that step (vi) is carried out if step (v) is carried out at a temperature of below 60° C.

19. A substrate coated with a polymerized film with fingerprint texture, obtained by a process comprising
(i) providing an optionally coated carrier film or an optionally coated substrate and optionally cleaning the carrier film or the substrate and/or generating a preferential direction on the film or substrate surface or on part of the film or substrate surface;
(ii) applying a composition comprising at least one achiral nematic polymerizable monomer and optionally at least one dispersion medium to the film or substrate surface; where the composition comprises at least one achiral nematic polymerizable monomer which is polymerizable with UV light of the formula I.1.1:

the composition comprising the at least one achiral nematic polymerizable monomer which is polymerizable with UV light of formula (I.1.1) in an amount of at least 25% by weight, based on the total weight of the achiral nematic polymerizable monomers present in the composition; and where the composition also comprises at least one chiral polymerizable monomer;
(iii) optionally aligning the composition applied in (ii) or part of the composition applied in (ii);
(iv) at least partly removing the dispersion medium optionally present;
(v) polymerizing the at least one monomer present in the composition under the action of UV light;
(vi) optionally thermally aftertreating the product obtained in step (v); and
(vii) optionally post-curing the product obtained in step (v) or (vi) under the action of UV light;
with the proviso that step (vi) is carried out if step (v) is carried out at a temperature of below 60° C.

20. An optical filter, polarizer, decorative media, forgeryproof marker, reflective media, or an antireflective media comprising the polymerized film of claim 18.

21. A method for preparing the polymerized film of claim 18, comprising
(i) providing an optionally coated carrier film or an optionally coated substrate and optionally cleaning the carrier film or the substrate and/or generating a preferential direction on the film or substrate surface or on part of the film or substrate surface;
(ii) applying a composition comprising at least one achiral nematic polymerizable monomer and optionally at least one dispersion medium to the film or substrate surface; where the composition comprises at least one achiral nematic polymerizable monomer which is polymerizable with UV light of the formula I.1.1:

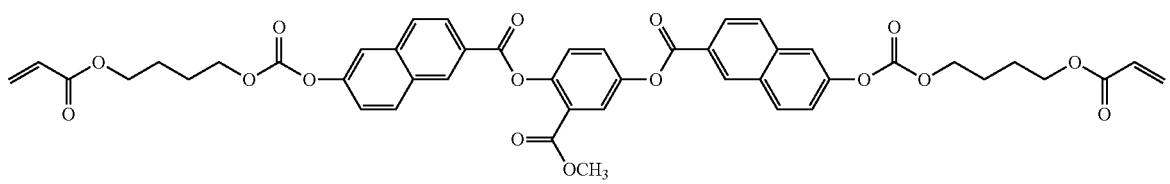
(I.1.1)

(I.1.1)

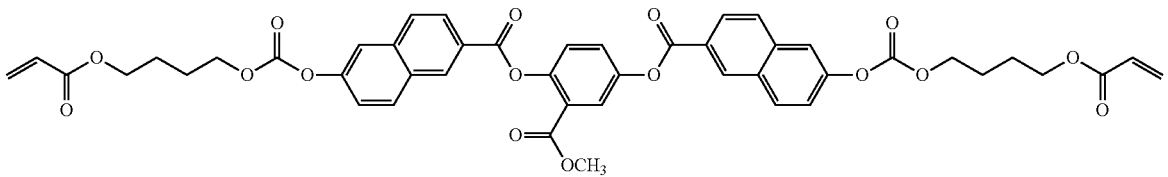

the composition comprising the at least one achiral nematic polymerizable monomer which is polymerizable with UV light of formula (I.1.1) in an amount of at least 25% by weight, based on the total weight of the achiral nematic polymerizable monomers present in the composition; and where the composition also comprises at least one chiral polymerizable monomer;

(iii) optionally aligning the composition applied in (ii) or part of the composition applied in (ii);

(iv) at least partly removing the dispersion medium optionally present;

(v) polymerizing the at least one monomer present in the composition under the action of UV light;

(vi) optionally thermally aftertreating the product obtained in step (v); and (vii) optionally post-curing the product obtained in step (v) or (vi) under the action of UV light;

with the proviso that step (vi) is carried out if step (v) is carried out at a temperature of below 60° C.

* * * * *